Nov. 29, 1927.

H. N. HALVERSEN 1,650,831

MULTIPLE GRADUATING MACHINE

Filed Oct. 11, 1926 14 Sheets-Sheet 3

INVENTOR
Hans N. Halversen
By Walter M. Fuller
ATTORNEY

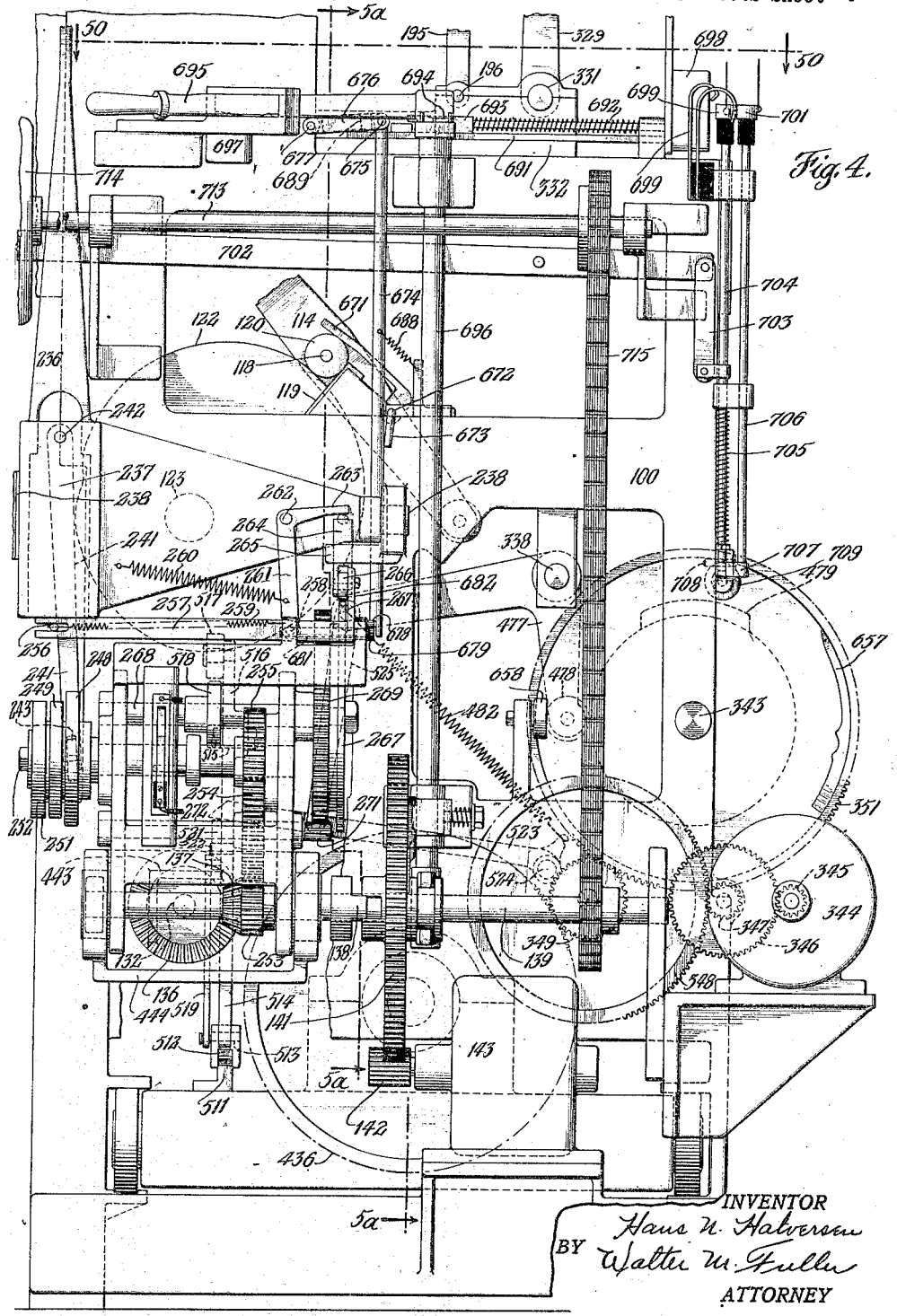

Nov. 29, 1927.
H. N. HALVERSEN
1,650,831
MULTIPLE GRADUATING MACHINE
Filed Oct. 11, 1926    14 Sheets-Sheet 5
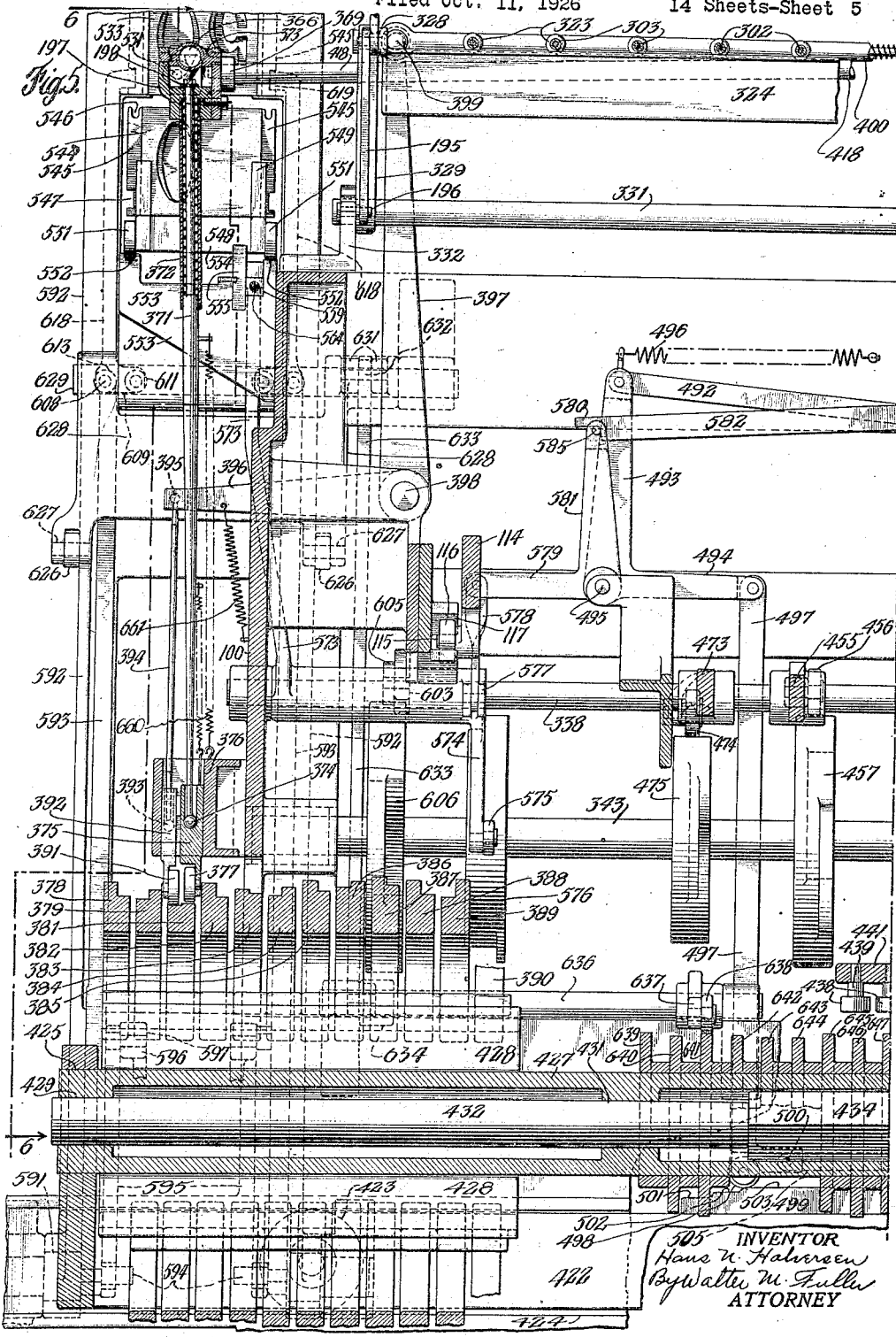
INVENTOR
Hans N. Halversen
By Walter M. Fuller
ATTORNEY Nov. 29, 1927.

H. N. HALVERSEN 1,650,831

MULTIPLE GRADUATING MACHINE

Filed Oct. 11, 1926 14 Sheets-Sheet 6

INVENTOR
Hans N. Halversen
BY Walter M. Fuller
ATTORNEY

Nov. 29, 1927.

H. N. HALVERSEN 1,650,831

MULTIPLE GRADUATING MACHINE

Filed Oct. 11, 1926 14 Sheets-Sheet 7

INVENTOR
Hans N. Halversen
By Walter M. Fuller
ATTORNEY

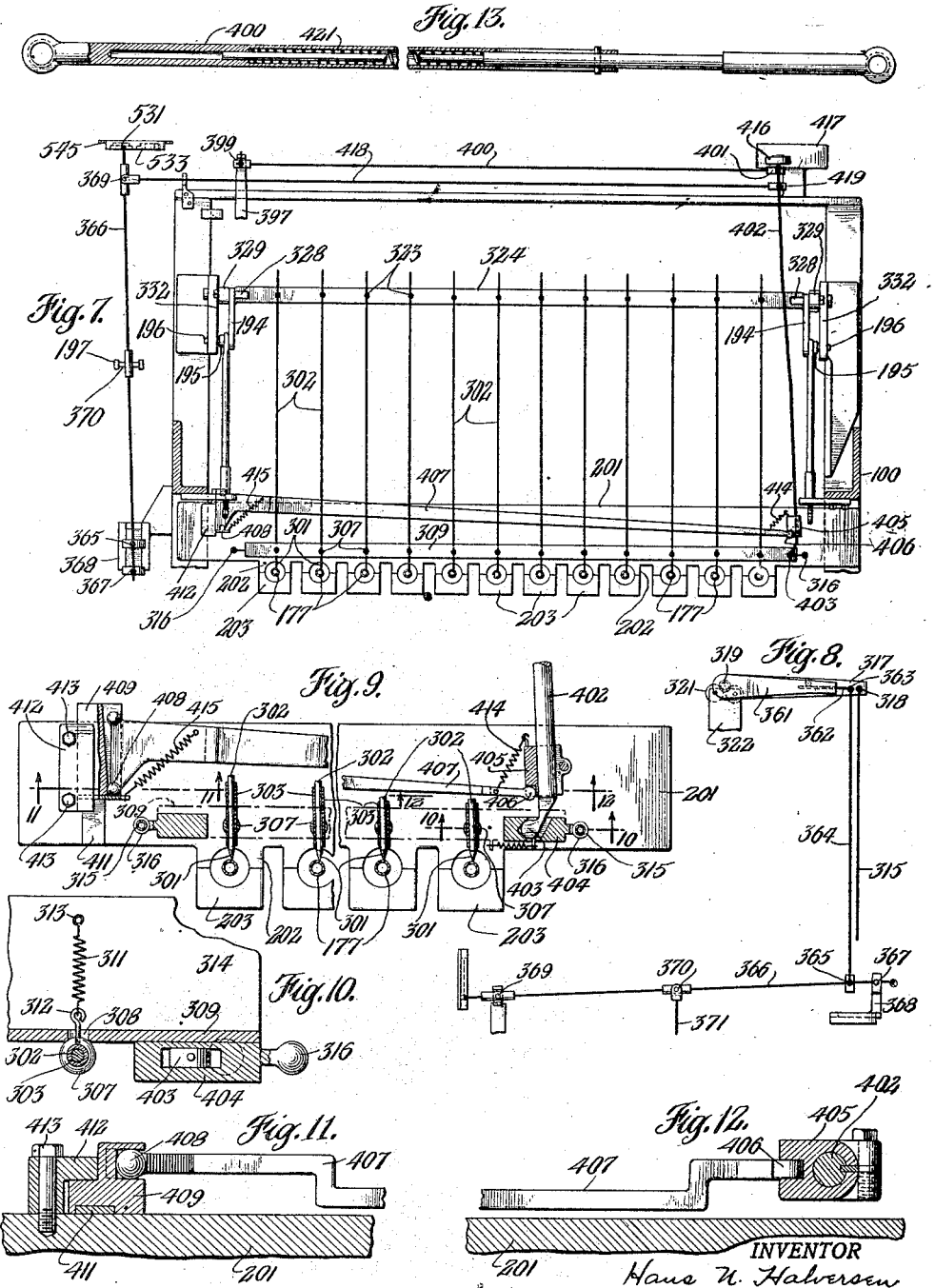

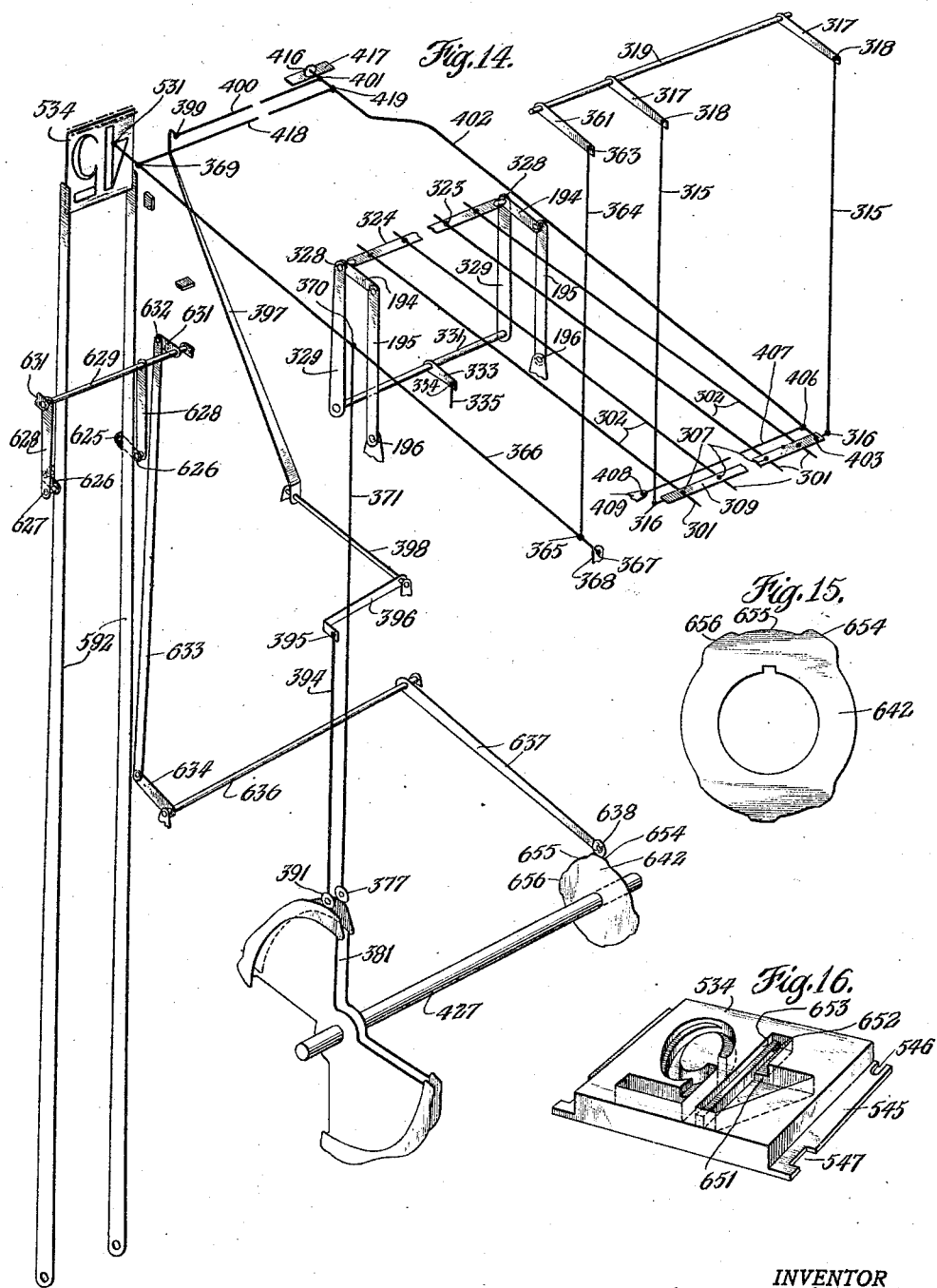

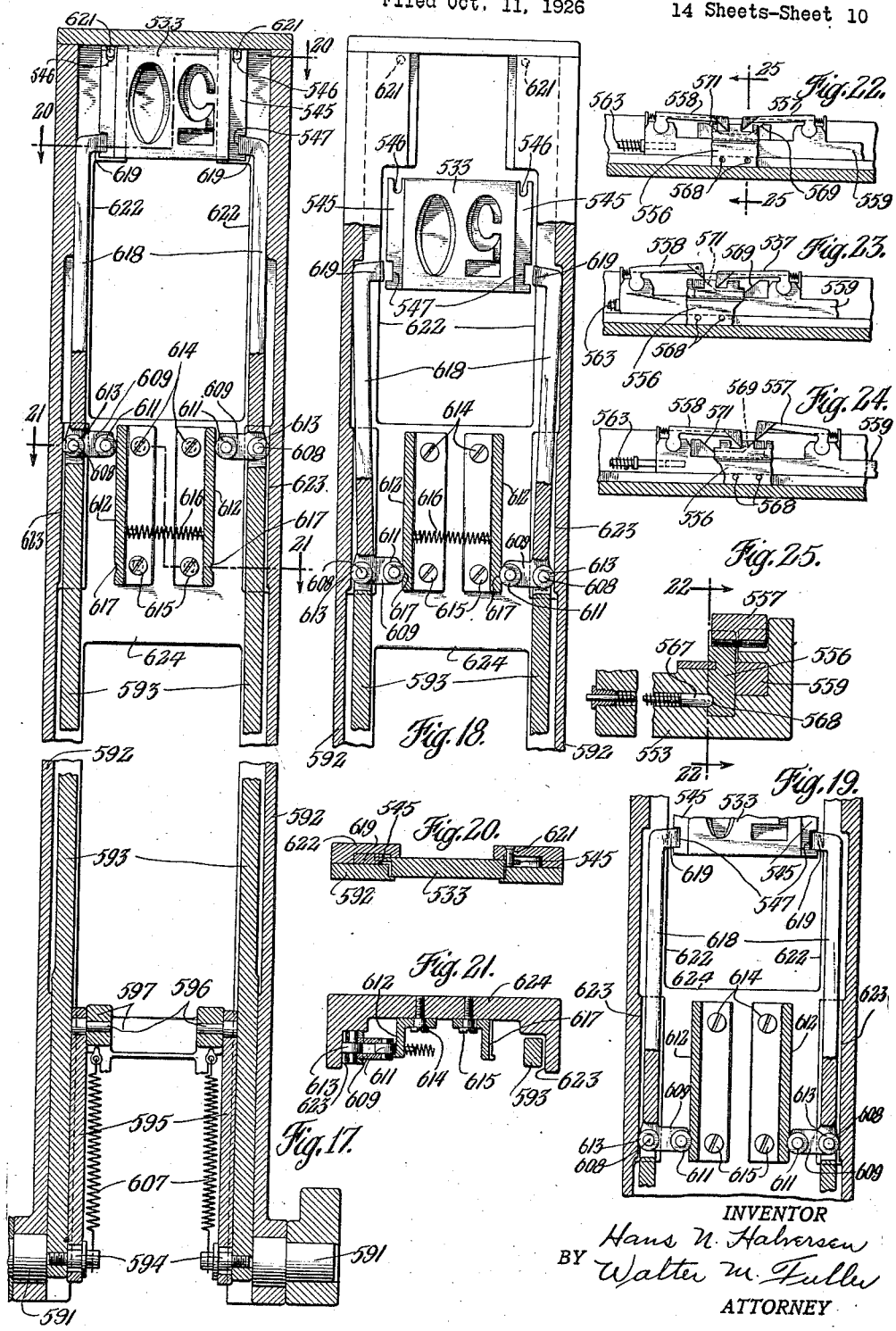

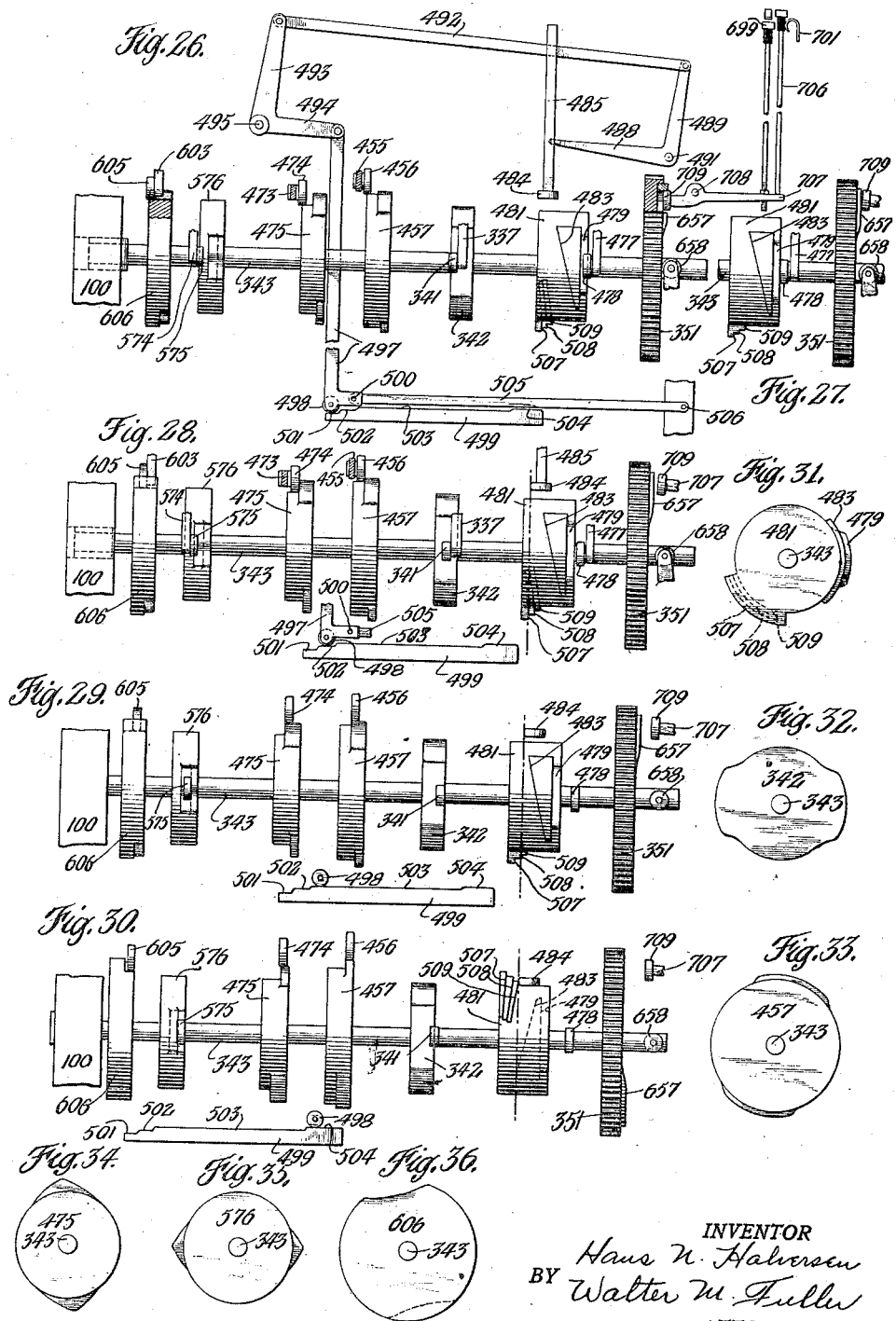

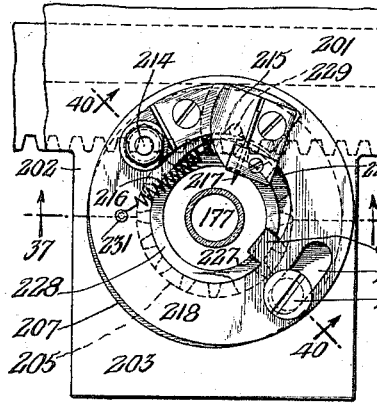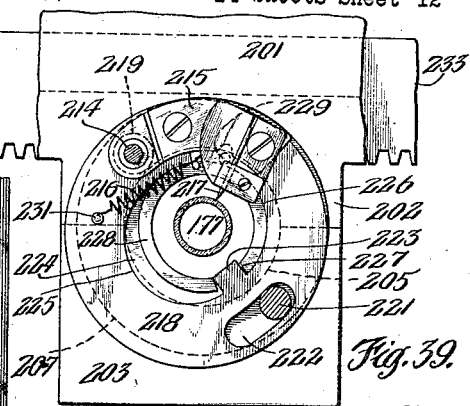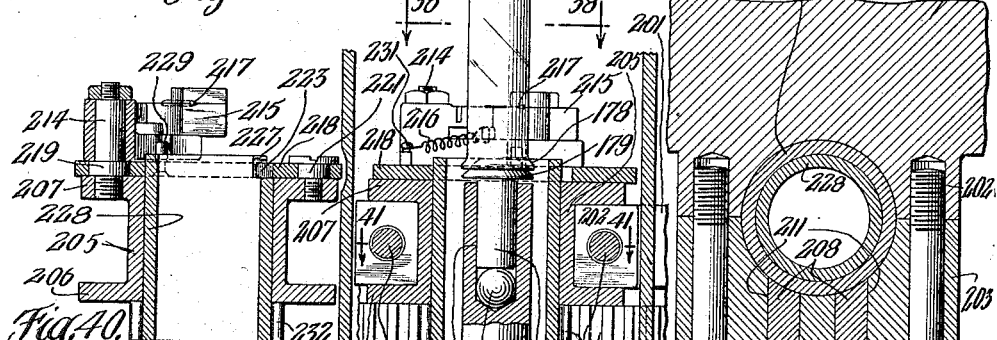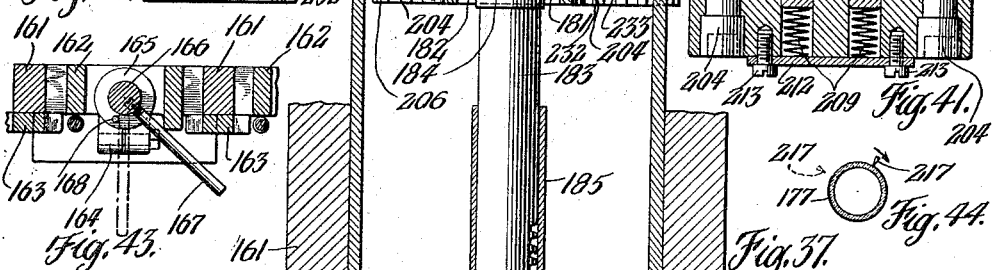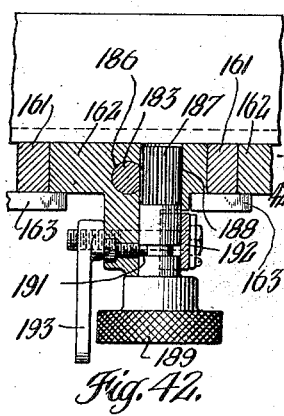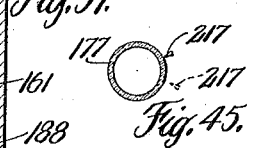

Nov. 29, 1927.
H. N. HALVERSEN
1,650,831
MULTIPLE GRADUATING MACHINE
Filed Oct. 11, 1926     14 Sheets-Sheet 13
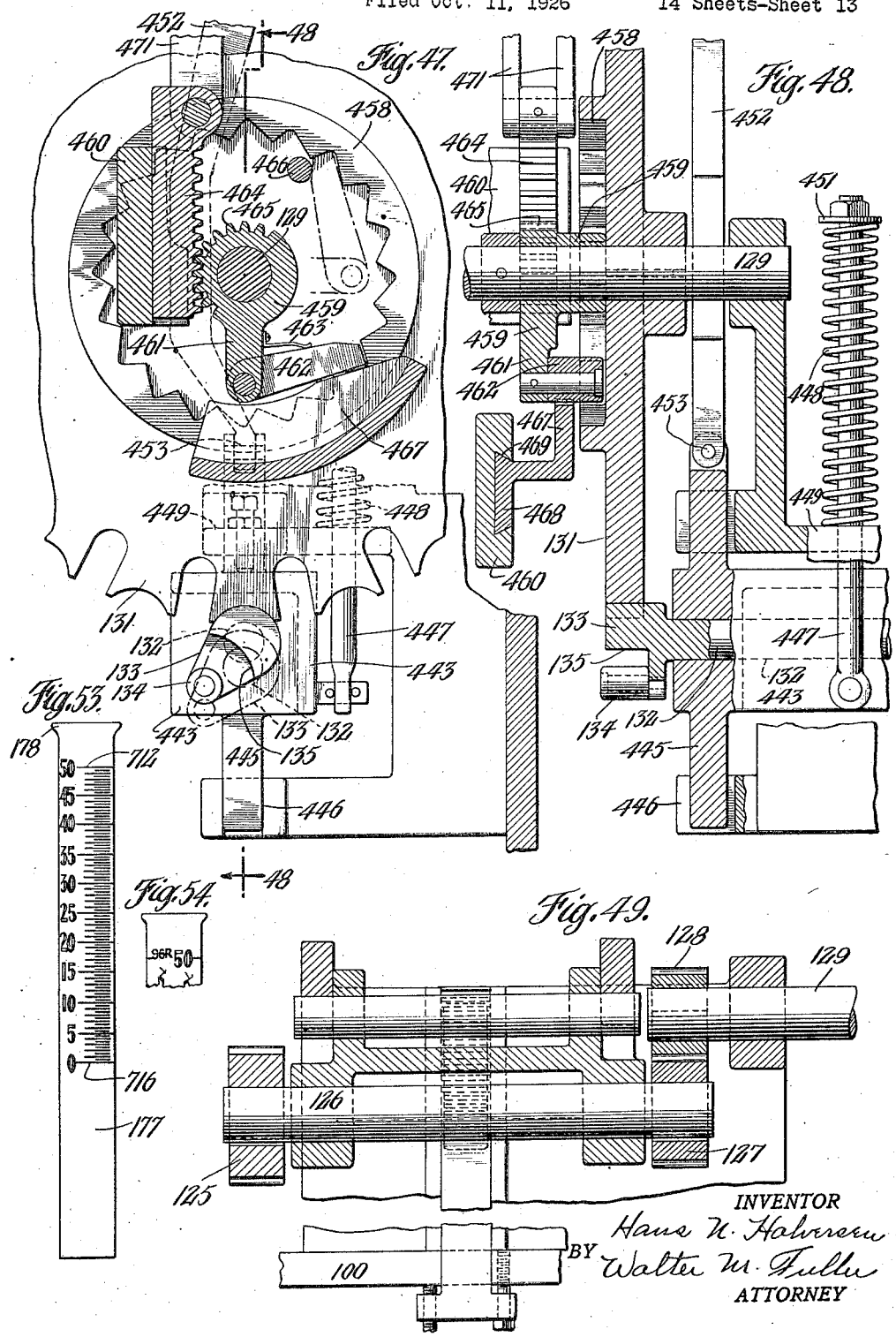
INVENTOR
Hans N. Halversen
BY Walter M. Fuller
ATTORNEY

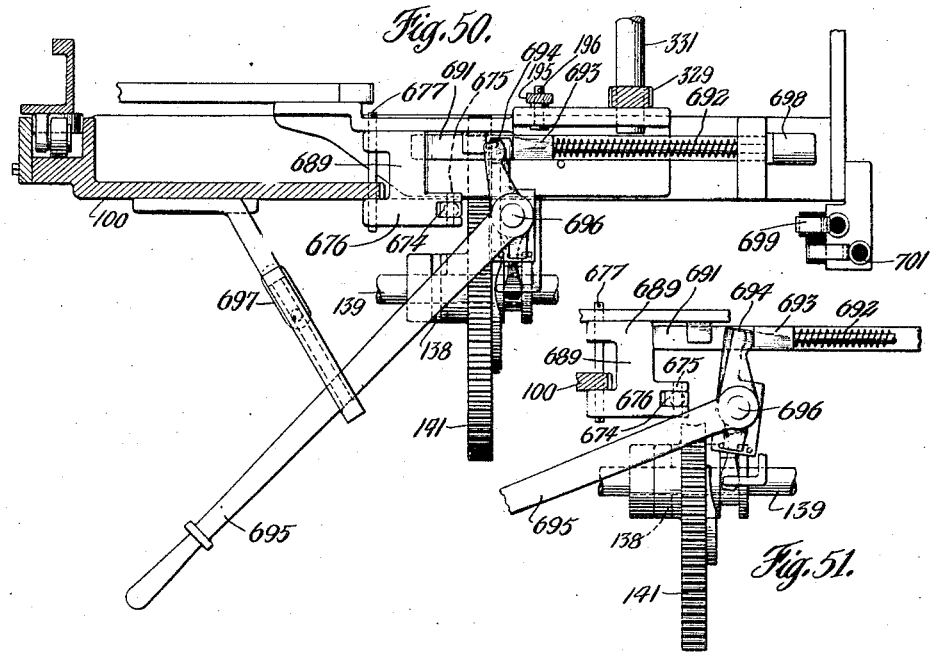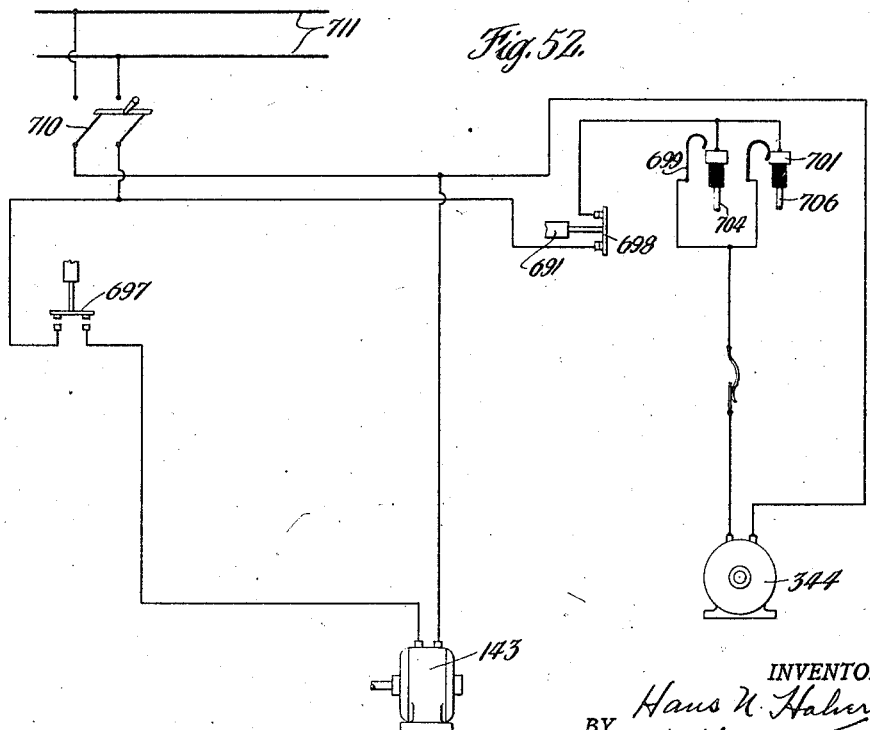

Patented Nov. 29, 1927.

1,650,831

UNITED STATES PATENT OFFICE.

HANS N. HALVERSEN, OF VINELAND, NEW JERSEY, ASSIGNOR TO KIMBLE GLASS COMPANY, OF VINELAND, NEW JERSEY, A CORPORATION OF ILLINOIS.

MULTIPLE GRADUATING MACHINE.

Application filed October 11, 1926. Serial No. 141,017.

The present invention relates to machines for graduating hollow, glass bodies or similar members, more specifically, but not restrictedly, tubular parts of glass milk testers, and aims to provide an appliance of this kind which will also apply the proper numeral or other legends opposite the spaced, volumetric, graduation lines, the device marking a plurality of such pieces of glassware at a time and automatically compensating for the variations in their internal calibers, the graduation numerals being spaced apart in accordance with the gaps or distances between the lines, so that the spacing of the latter and their associated numerals are in harmony and consonance.

The several advantages, both structural and functional, accruing from the employment of the invention will be made apparent to those skilled in the art from the following detailed description of a present, preferred embodiment of the invention which has been illustrated in the accompanying drawings, forming a part of this specification, and throughout the several views of which like reference characters have been employed to designate the same parts.

In these drawings—

Fig. 4 is a partial end elevation of the machine looking toward the left-hand end of Fig. 1, and on a larger scale;

Figure 1:
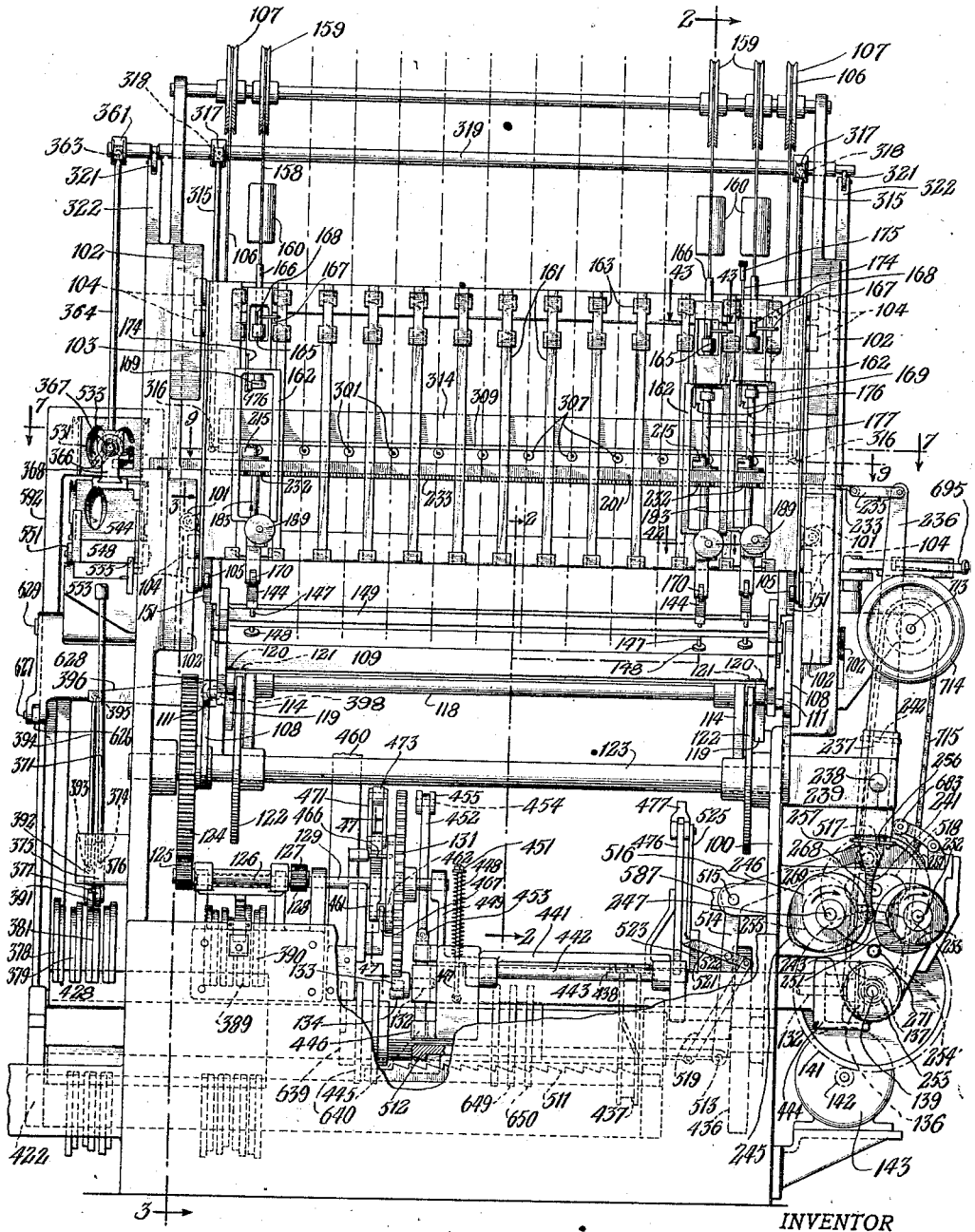
Fig. 1 is a front elevation of the improved machine with some of the rear parts omitted and with the intermediate glass-tube carrier units indicated merely by dot and dash center lines.
Figure 3:
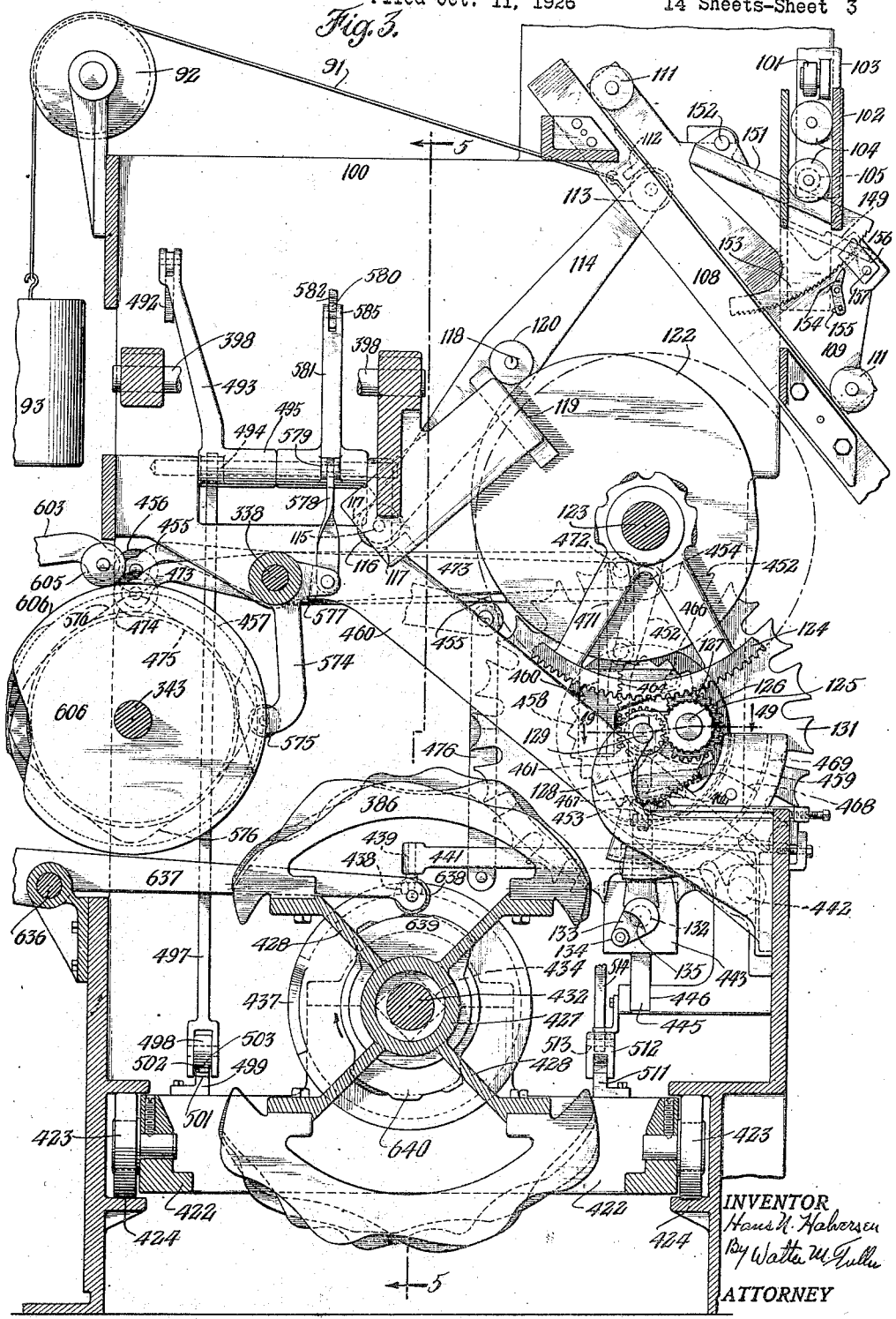
Fig. 3 is an enlarged, fragmentary, vertical cross-section taken practically on line 3—3 of Fig. 1, with some of the parts illustrated in elevation.
Figures 5A, 55:
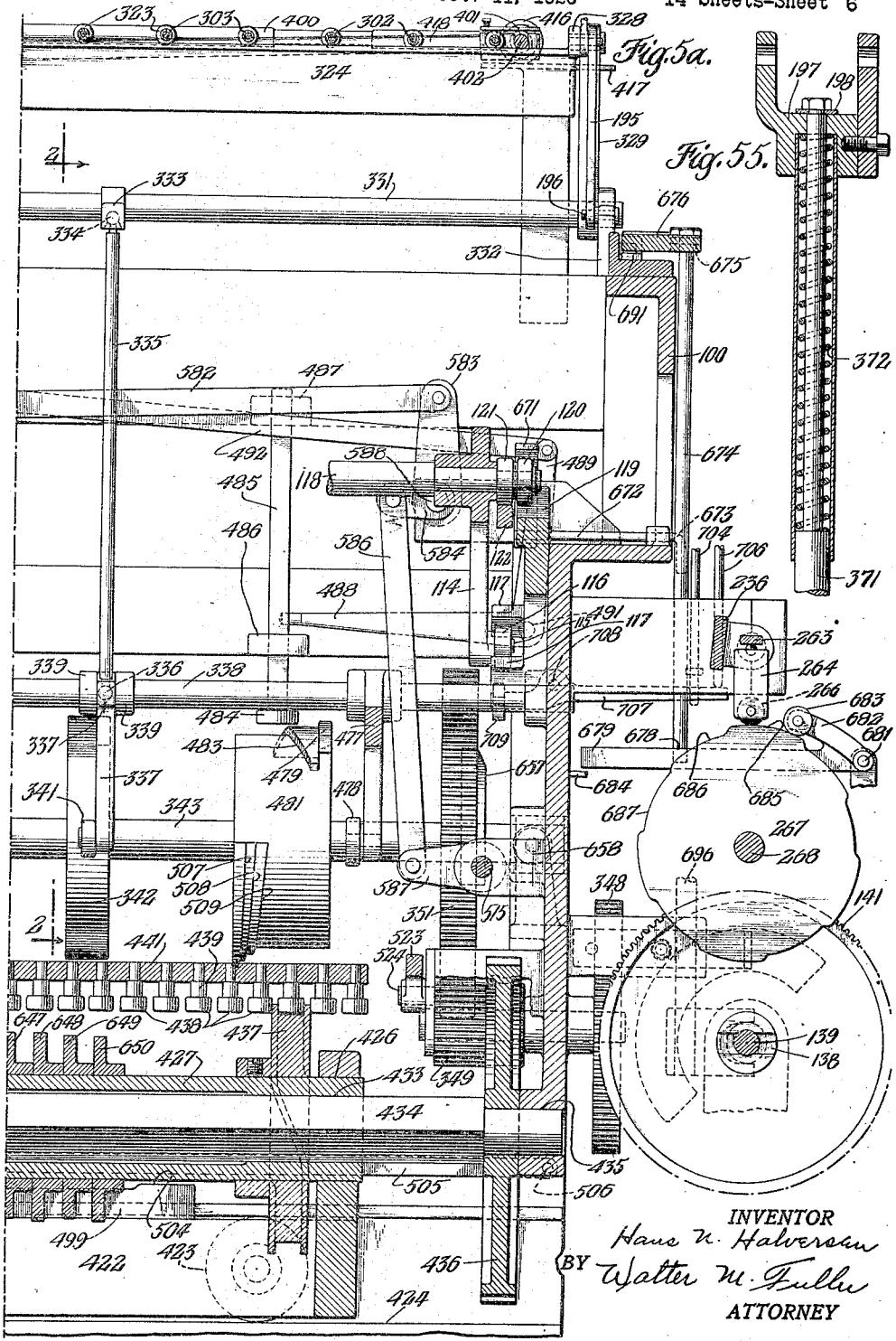
Fig. 5 is a partial, longitudinal, sectional elevation of approximately one-half the machine, taken substantially on line 5—5 of Fig. 3.
Figure 6:
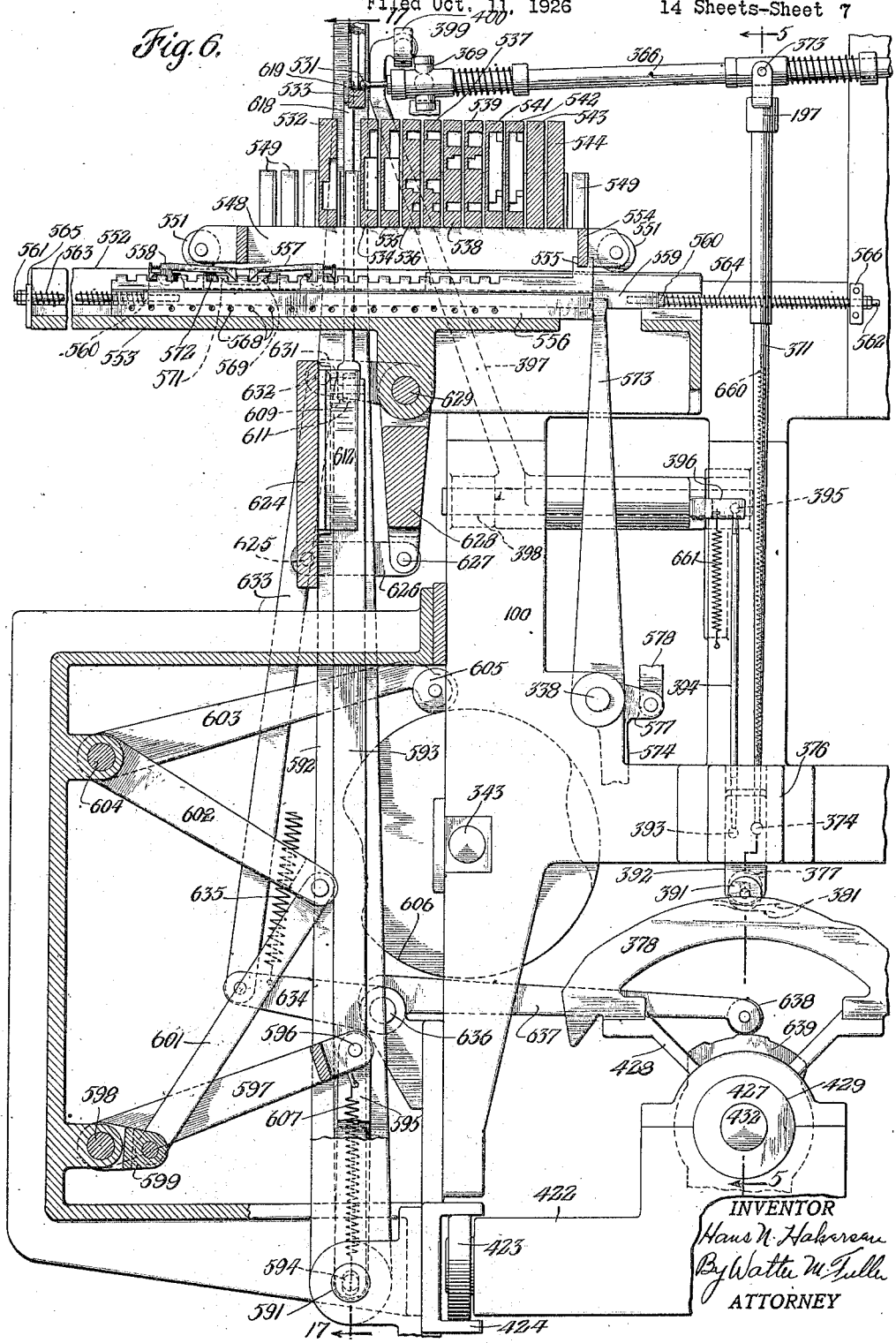

Fig. 5ª is a view similar to Fig. 5, taken on about the same plane as Fig. 5, as indicated by line 5ª—5ª—5ª of Fig. 4, but showing the other half of the machine;

Fig. 6 is a fragmentary, end, sectional elevation on approximately line 6—6 of Fig. 5;

Fig. 7 is a diagrammatic, plan section of the scribing mechanism for applying the graduation numerals to the glass tubes, the section being taken on line 7—7 of Fig. 1;

Fig. 8 is a diagrammatic, end elevation of that part of the appliance shown in Fig. 7 looking toward the right;

Fig. 9 is an enlarged, fragmentary, plan section of a portion of the scribing appliance, taken on line 9—9 of Fig. 1, a part of the view being broken out to condense the figure;

Figs. 10, 11 and 12 are enlarged, detail sections on lines 10—10, 11—11, and 12—12, respectively, of Fig. 9;

Fig. 13 is a detailed view, partly in section, of one of the connecting arms or rods of the scribing mechanism;

Fig. 14 is a diagrammatic, perspective view of the numeral-scribing mechanism, indicating the various connections and operating parts employed;

Fig. 15 is a face view of one of the cams for moving the matrix or numeral block operated on into its various positions, the particular cam shown being the one actuating the No. 45 matrix;

Fig. 16 is a perspective view of such No. 45 matrix;

Fig. 17 is a partial elevation and partial section through the holder for the matrix block being operated on, the section being taken on line 17—17 of Fig. 6;

Fig. 18 is a fragmentary view similar to that of Fig. 17, indicating a different operating position;

Fig. 19 is a partial view showing another operating position of the device illustrated in Fig. 17;

Figs. 20 and 21 are plan sections taken on lines 20—20 and 21—21, respectively, of Fig. 17;

Figs. 22, 23 and 24 depict three positions of the device or pawl and ratchet mechanism for advancing the matrix carriage, the views being substantially on line 22—22 of Fig. 25;

Fig. 25 is a cross-section on line 25—25 of Fig. 22;

Figs. 26 to 30, inclusive, are diagrammatic position views showing the various operating positions of the rear cam shaft;

Figs. 31 to 36, inclusive, are detailed views of the various cams mounted on such rear shaft;

Fig. 37 is a sectional view of a portion of one of the glass-tube carriers or slides and its line marking or scribing device, the section being taken on line 37—37 of Fig. 38;

Fig. 38 is a plan section on line 38—38 of Fig. 37, with the line-scriber retracted from the ware or glass tube with which it is designed to co-act;

Fig. 39 is a view similar to that of Fig. 38, but shows the parts in the positions they assume when the line scriber or marker is in contact with the ware or glass tube on which it acts;

Fig. 40 is a section through the line scribing or marking device on line 40—40 of Fig. 38;

Fig. 41 is a plan section on line 41—41 of Fig. 37;

Fig. 42 is a plan section on line 42—42 of Fig. 37 and is drawn on a reduced scale;

Fig. 43 is a plan section on line 43—43 of Fig. 1;

Figs. 44, 45 and 46 are diagrammatic views indicating the points at which the line-scriber contacts and leaves the ware for the three graduation lines of different lengths;

Fig. 47 is a fragmentary, sectional view of the ware-advancing mechanism employed, including the Geneva movement, the section being taken on line 47—47 of Fig. 1;

Fig. 48 is a section on line 48—48 of Fig. 47;

Fig. 49 is a plan section on line 49—49 of Fig. 3;

Fig. 50 is a fragmentary, plan section on line 50—50 of Fig. 4, illustrating one starting device of the machine;

Fig. 51 shows another position of the mechanism presented in Fig. 50;

Fig. 52 is an electrical wiring diagram of the machine;

Figs. 53 and 54 are detailed views of the finished, graduated article, Fig. 54 being of a fragmentary nature and showing the glass tube turned somewhat from the position of Fig. 53 to display the legend "9GR"; and Fig. 55 is an enlarged section of the telescopic rod constructon shown in Fig. 5.

Referring to the several views of these drawings, it will be seen that the improved and novel machine includes a main-frame 100 of suitable shape and form which, in its upper part, has a plurality of parallel, upright guideways 102, 102 (Fig. 1) to guide the reciprocation of a main carriage 103 having anti-friction rollers 101—101 co-operating with the opposite walls of the guideways to secure the proper, vertical, sliding travel of the carriage, the latter at the lower portions of its two ends being equipped with a pair of supporting rollers 105, 105 (Fig. 1).

Such principal, upright, sliding carriage 103 is desirably partly counterbalanced by means of cables 106, 106 (Fig. 1) extending over sheaves 107, 107 and carrying weights (not shown) on their other ends, and it is caused to slide either up or down, step by step, by means of a wedge-mechanism traveling on a pair of inclined tracks or rails 108, 108 mounted on the inner, opposite sides of the main-frame (Figs. 1, 2, 3), such wedge-device comprising a carriage 109 (Figs. 2, 3) equipped with carrying, anti-friction wheels 111, 111 rolling on the top edges of such members 108.

In order to slide the wedge-carriage 109 intermittently or interruptedly during the graduation line and numeral applying operations, it is fitted at its opposite ends with depending brackets 112 (Fig. 2), against each of which bears a roller 113 on its corresponding lever 114, supplied at its other end with a sliding fulcrum composed of a roller 116 (Fig. 2) having its bearing on the lever at 115 and adapted to travel between two, spaced walls 117, 117 rigid with or fixed to the main-frame.

Inasmuch as both portions of this mechanism are alike, a complete description of one will suffice for both.

Such two levers 114, 114 are mounted on a shaft 118 connecting them together, and such shaft at its opposite ends is supplied with two rollers 121, 121 riding on the edges of two like cams 122, 122 mounted on an appropriately-journaled shaft 123.

In order to guide the travel of the two rollers in the proper path of movement, shaft 118 at each end is equipped with another roller 120 which rides on the face of an inclined projection or track 119 (Figs. 2, 3) on the main-frame of the machine, and the active surface of which is parallel with the corresponding track or rail 108, whereby to give the arm or lever 114 a radial movement with respect to the shaft 123.

If desired, the wedge carriage 109 and the parts mounted thereon may be partially counterbalanced by cables 91 passing over suitably-mounted sheaves 92 and being equipped at their hanging ends with appropriate weights 93 (Fig. 3).

Obviously, to cause or permit the intermittent travel of the wedge carriage 109, it is necessary to turn shaft 123 and its two cams 122 interruptedly by appropriate mechanism, and this will now be described.

As is indicated in Fig. 1, shaft 123 has a gear 124 fixed thereon in mesh with a pinion 125 on a shaft 126 (Figs. 1 and 49) driven from a parallel shaft 129 through intermeshing, intervening gears 127, 128 (see also Fig. 3).

Shaft 129 is driven from a shaft 132, the two end portions only of which are shown in dotted lines in Fig. 1, by means of a Geneva movement 131, 133, 134 and 135, of usual or convenient form (Figs. 1, 47, 48), so that whereas shaft 132 rotates continuously, shaft 129 will be revolved intermittently or step by step.

As is depicted in Fig. 4, shaft 132 is operatively connected to a horizontal end shaft 139 through co-acting bevel gears 136, 137, and slidingly mounted on the shaft 139, but coupled thereto as to rotate therewith, by a detachable coupling 138, is a gear 141 in mesh with a wider or longer pinion 142 rotated by an electric-motor 143.

It is this electric-motor which drives or operates the mechanism during the marking of the spaced graduation lines on the ware.

The present machine is designed and constructed to graduate several (twelve), glass, tubular members 177 at the same time, and, accordingly, the sliding, wedge carriage 109 has pivoted thereto at 145 (Fig. 2) twelve, supplemental, adjustable, wedge arms 144, pulled downwardly by their coiled, contractile springs 146 against their individual adjustment screws 147 extending through threaded holes in a bar 149 forming part of the carriage 109, and each having a knurled head 148 by means of which it may be readily turned to vary or modify the angular position of the corresponding wedge bar or arm 144.

At each end of the machine, the bar 149 is mounted on a ratchet-sector 153, one of which is shown in Fig. 3, fulcrumed on the carriage 109 at 152, each such sector having a main wedge bar 151 on which the corresponding, vertically-slidable carriage-roller 105 bears and travels.

In order that the two ends of the bar 149 may be adjusted equally preparatory to graduating tubes of different lengths, each sector 153 is equipped with a pawl 154 which, when in an inoperative position, drops down against the stop 155, each sector being held in its adjusted position by a single clamp 156 and an associated, tightening screw 157.

The two sectors at the opposite ends of the wedge carriage may be adjusted with the dogs or pawls in the corresponding notches, and then the clamps may be tightened for firmly holding the parts in position, whereupon the dogs may be rocked down into inoperative position.

Stated somewhat otherwise, the parts are maintained securely and fixedly in operative position, the dogs or pawls being convenient means for initially holding the sectors in place while being clamped.

As has been presented in Fig. 1, the main tube carriage 103 is provided with twelve, parallel, upright guideways 161, 161, in each of which a glass-tube supporting, skeleton slide 162 is designed to reciprocate, a reduced part of the upper portion of each such slide being maintained detachably in its guideway by retainers 163, 163.

Each individual tube slide or carriage 162 is partially counterbalanced by a weight 160, connected thereto by a cable 158 passing over a sheave 159 conveniently and appropriately mounted on the upper portion of the machine, all as is clearly shown in Fig. 1.

Figure 2:
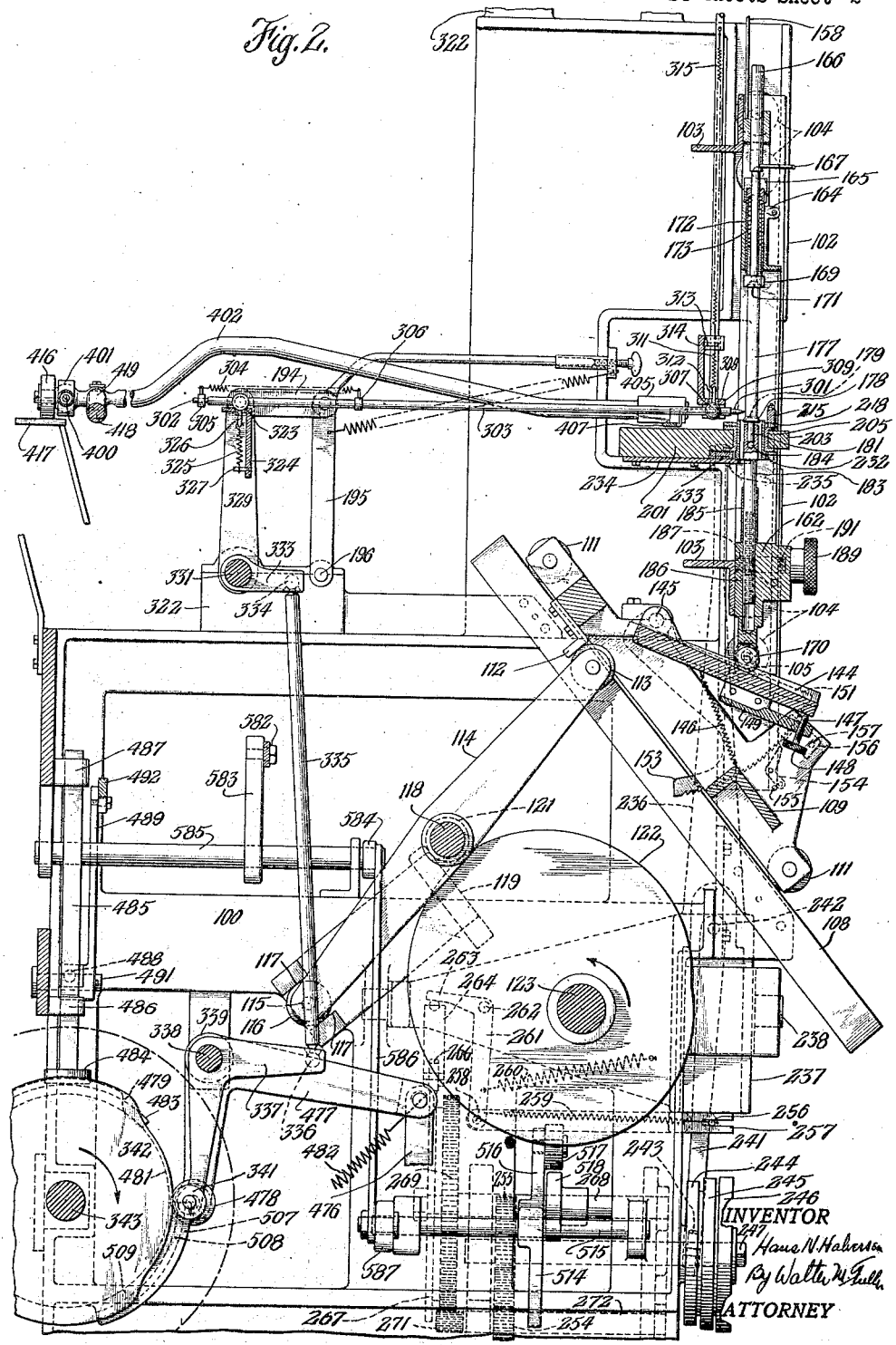
Fig. 2 is a fragmentary, vertical, enlarged cross-section taken substantially on line 2—2—2 of Fig. 1, with certain of the parts appearing in elevation and with some of the members broken away.

As is presented in Fig. 2, the reduced, lower end of each glass-tube carriage is fitted with an anti-friction roller 170 (Fig. 2) bearing on the top of its corresponding, adjustable wedge-bar 144, whereby as the carriage 109 travels upwardly or downwardly, as the case may be, on its inclined tracks 108, 108, the several tube carriages 162 will be moved accordingly, but yet they can all vary as to the degree of travel by reason of the individual adjustability of their members 144.

The upper section of each such glass-tube carriage 162, as is shown clearly in Fig. 43, is formed to provide a split clamp 164 designed to grip a sleeve 165 in the slide, such sleeve or bushing accommodating an upright shaft 166 fitted with an outstanding handle 167 designed to rock the shaft, the turning of such handle in one direction being limited by a part of the slide itself, as shown in full lines in Fig. 43, and in the other direction, as presented by the dotted lines in Fig. 43, by a stop pin 168 projecting upwardly from the top of the element 165.

The lower, enlarged end or head 169 (Fig. 2) of each such upright shaft 166 has in its bottom face a conical socket or recess 171 adapted to accommodate the upper end of the glass tube 177 to be operated upon.

To give each such shaft 166 and its clamping head a yielding mounting, a coiled spring 172 surrounds a reduced-diameter part of the shaft (Fig. 2), the spring bearing at one end against the head 169 and at its other end against the terminal portion of a thin, metal sleeve 173 forming a portion of the member 165.

Obviously, any other appropriate, yielding means might be provided for clamping the top end of the glass tube and permitting it to be turned about its axis for a purpose hereinafter indicated.

The top or upper part of each slide 162 is supplied with a vertical bearing receiving a sliding rod 174 (Figs. 1, 37) having an adjustable, screw-threaded head 175 at its top and equipped with a pointer 176 at its lower end, and it will be observed that the enlarged head 175, when it strikes the top of the carriage during the descent of the rod, limits the downward travel of the pointer 176 and gives it a definite position.

The lower, flaring open-mouth 178 (Fig. 37) of each glass tube 177 to be graduated is mounted and supported on a conical head 179 on the top of a short, upright shaft 181 revoluble in a bearing 182 in a vertical shaft 183, an anti-friction, ball bearing 184 being interposed between the end of the shaft 181 and the bottom of the socket in the other shaft, as is clearly shown.

Shaft 183 extends through a shell 185 and has a sliding bearing 186 in the carriage or slide 162, one side of such shaft being equipped with rack teeth in mesh with those of a pinion 188 cut on a shaft 187 (Figs. 37, 42), the exposed end of the latter having a knurled head 189 by means of which the pinion may be turned and the shaft 183 elevated or lowered, shaft 187 being prevented from coming out of its bearing by a groove and pin connection 191 (Fig. 42). This shaft 187 is designed to be held securely in adjusted position by a screw clamp 192 of any appropriate form extended part way around the shaft and adapted to be tightened by the turning of a handle 193 on a threaded shank of the clamp, as is fully shown in Fig. 42.

In the actual operation of the machine it has been found more convenient to apply the numerals to the glass tubes first and then perform the graduating operation by the marking of the spaced lines, but it is perhaps easier to understand the construction by first describing the means for scribing the spaced, graduation lines on the tubes, and this will now be done.

A horizontal bar 201 (Figs. 1, 38, 39, 41) extends across the front of the machine and is mounted on its main-frame, this bar having spaced projections 202 extended forwardly for each guideway 161, and each such part 202 is fitted with a cap 203 (Fig. 2) fastened thereto by a pair of screws 204, 204, each pair of companion parts 202 and 203 providing a bearing for a sleeve or hollow shaft 205 having top and bottom, circular flanges 206 and 207 (Fig. 40).

As is fully indicated in Fig. 41, each cap 203 has a pair of bearings 211, 211, accommodating two brake-blocks 208, 208, forced toward the outer surface of the hollow sleeve or bushing 205 by coiled springs 209, 209, bearing at one end against a cover plate 212, held to the cap plate by screws 213, 213, and pressing at their other ends against their respective brake-blocks.

A stud shaft 214 (Figs. 38, 40) is mounted on and projects upwardly from the top flange 207 of each hollow shaft 205, and rockingly fitted on such shaft is an arm 215 carrying a marker, scriber or needle 217 designed to mark or cut the spaced, graduation, volumetric lines of different lengths in the wax coating of the corresponding glass tube 177 by means of a mechanism hereinafter described.

A coiled spring 216 (Fig. 38) connects the arm 215 with a pin 231 on a ring-shaped plate 218 fulcrumed on an enlarged portion 219 of the stud shaft 214 (Figs. 38, 39, 40).

Such circular disk or ring 218 is held down to its work by means of a screw 221 extended through a slot 222 in the disk and taking into a threaded hole in the flange 207, as shown in the three figures referred to.

This ring or disk 218 has a projection 223 extending into its central aperture 224, which is not round, but of somewhat elliptical shape, its width being substantially the same as the external diameter of a sleeve or bushing 228 referred to below, its length being somewhat longer, providing the two opposite surfaces 225 and 226 (Fig. 39).

The tongue or projection 223 fits in a recess or space 227 of the hollow shaft 228 (Figs. 39, 40), and in addition the ring 218 has an upstanding stud or pin 229 adapted to coact with and to retract the scriber or marker arm 215 under circumstances presented below and as shown in Fig. 38, movement of the part 218 permitting the marker to engage the tube as represented in Fig. 39.

Referring to Fig. 40, it will be perceived that the lower, protruding end of the hollow shaft 228 is supplied with a gear 232, or the gear teeth may be cut in the shaft itself, as may be preferred, and all of the twelve gears 232 of the plurality of scribing devices are in mesh with the teeth of a long rack 233 (Figs. 38, 39) common to all of them and slidable in a guideway in the bar 201, being retained in place by a bottom plate 234 secured to the bar by suitable screws, as indicated in Fig. 2.

The end of such rack bar 233 (Fig. 1) is connected by a link 235 to the top end of a lever 236 having a hollow, lower portion 237 (Fig. 4) fulcrumed at 238 in a bracket 239 (Fig. 1) secured to the main-frame.

An arm 241 is rockingly mounted at 242 inside of the hollow part 237 of the lever 236, and its lower, protruding end is fitted with a roller 243 (Fig. 1) between and adapted to cooperate with two sets of three cams each, 244, 245 and 246, on shaft 247 (Fig. 2), and 248, 249 and 250 on shaft 252 (Fig. 4).

The end shaft 139, heretofore mentioned, has on it a small gear 253 (Figs. 1, 4) in mesh with the teeth of a gear 254 (Figs. 1, 4), which in turn is in co-operative relation with the two gears 255, 255 on the two shafts 247 and 252, and from the above it will be understood that the two sets of three cams each are rotated in unison from power derived from motor 143 through the intervening gearing, the extent of travel of the rack 233 common to all of the gears 232 being changeable, as the lever 241 may be shifted from co-active relation with one pair of cams to another pair.

Lever 241 (Fig. 4) is pulled to the right by one or more springs 259 acting on a rod or pin 256 bearing on the outer edge of the lever and accommodated in slots of a pair of arms 257 on opposite sides of the lever, and fulcrumed at 258 to one arm 261 of a bell-crank lever rockingly mounted at 262, the other arm 263 of which is designed to be rocked by a slide 264 (Fig. 4) reciprocatory in a stationary bearing 265, the member 264 at its lower end having an antifriction roller 266 coacting with the edge of a cam 267 on a shaft 268 driven from shaft 272 by the intermeshing gears 269 and 271, shaft 272 being the one on which the intermediate gear 254 heretofore mentioned is mounted, the driving means for such shaft having been already described.

During the intervals between the marking of the spaced graduation lines on the glass tubes, the carriage 103 carrying all of the glass tubes is stepped upwardly intermittently to provide the proper spaces between the lines, and the marking of the tubes simultaneously by the plurality of needles 217 is accomplished by the movements of the rack 233 through the mechanism described.

Referring to Fig. 53, it will be seen that each 10th graduation line extends almost all the way around the tube, leaving a suitable space for the numerals and any other legends, the intermediate or interjacent lines being of two different lengths, alternating.

When the roller 243 is between the two innermost cams 244 and 248, the needles will make the longest or 10th lines.

When such roller is between the middle cams 245 and 249, the needles will scribe the shorter, intermediate lines, and when such roller is between and coacting with cams 246 and 251, the scribers will mark the intermediate lines of longer length, the position of roller 243 with respect to such cams being determined by the action of cam 267 (Fig. 5ª), which has one high spot 685 and nine surfaces 686 and 687 of alternating, different heights, the portions 686 forming the shorter lines and the sections 687 corresponding to the lines of intermediate length.

When the rack bar 233 starts its travel to the right, as the parts are viewed in Figs 38 and 39, through the connection 223, 227, it rocks each disk 218 in a direction to carry the post or pin 229 away from the arm 215, and the latter, responding to the action of its spring 216, presses the needle or scriber against the wax-coated, outer surface of the glass tube, this initial or preliminary movement of the needle to the work being occasioned by the fact that turning of the sleeve 205 at that time is resisted by the friction action of the brake-shoes 208.

In other words, the part 205 will not begin to rotate until arm 215 can turn no further, which occurs when the needle strikes the work, and thereafter the movement of the bar 233 overcomes the friction of the brake-blocks and rotates the sleeve 205, and the needle which it carries, about the axis of the tube, causing the needle to mark through the wax a line the length of which is in conformity with the length of travel of the rack-bar at that time.

When the rack-bar begins its backward movement, owing to the friction imposed by the brake-blocks 208 on the part 205, it causes the rocking of the disk 218 around its fulcrum, carrying the needle away from the glass tube, so that there is no interference with the line already made, and then moves the needle back to original position in this out-of-contact relation to the tube.

Of course, it is to be understood that all of the tubes are graduated by their needles simultaneously.

Fig. 44 shows in full lines the point at which the needle engages the tube, and in dotted lines the place where it leaves such tube in making the long, 10th lines.

Fig. 45 shows in corresponding manner the marking of a short, unit line; and Fig. 46 depicts in a like way the scribing of a longer, unit line.

Between the line-marking operations, the carriage carrying all the tubes is stepped up the proper amount and locked in the new position by the Geneva movement, but the travel of the individual tubes, during this movement, may differ because of the adjustments of their corresponding wedge-bars 144, and in this way compensation is made for the variations in the internal calibers of the tubes.

Referring now to the mechanism for applying or marking the spaced numerals and other legend on the glass tubes, and bearing in mind that such figures are applied upside down to such members, as will be more fully specified hereinafter, it will be observed that the machine includes twelve, substantially-horizontal, parallel rods 302, 302, the front ends of which are sharpened or formed as marking or scribing points or needles 301 (Figs. 1, 2, 9, 14), and inasmuch as the construction of all of these markers is alike, a full description of one will suffice for all.

Each such rod 302 is slidingly mounted in a tube or sleeve 303 (Figs. 2, 9), and is pulled forwardly therein by a coiled spring 304 connected to a collar 305 on the rear end of the rod and to another collar 306 on the sleeve, and, at its forward end portion, each such tube or sleeve has a ball 307 (Figs. 2, 9, 10) having a bearing in a round hole 308 (Fig. 10) in a horizontally-disposed angle-bar having a forwardly-projecting flange 309 and a companion, upright flange 314, the ball being yieldingly held in its bearing by a coiled, contractile spring 311 joined to a clip 312 (Fig. 10) secured to the ball, and fastened at its other end to a pin 313 extended forwardly from the flange 314.

Referring to Fig. 14, it will be noted that the angle-bar 309—314 is supported at its opposite ends by two, upright links, 315, 315, having ball-and-socket joints 316, 316 with the bar 309—314, and having at their upper ends similar universal-joint connections 318, 318, with two arms 317, 317, fixedly mounted on and projecting forwardly from a rock-shaft 319 (see also Fig. 1) supported on roller-bearings 321, 321, on the top ends of a pair of standards or posts 322, 322.

By reference to Figs. 2 and 14, it will be apparent that the rear end of each tube or sleeve 303 is fitted with a supporting ball 323 partly accommodated in a round hole in the horizontal flange of an angle-bar 324, such globular member being properly, yieldingly held in its bearing by a spring 325 connected thereto through a clip 326 and joined to the angle-bar 324 by a pin 327.

As is fully depicted in Figs. 5, 5ª and 14, the opposite ends of the angle-bar 324 are rockingly mounted at 328, 328, upon two arms 329, 329, fixed to an appropriately-journaled rock-shaft 331, the bearings for which are conveniently provided in brackets 332, 332.

In order to give these numeral-scribers a parallel-motion movement, extensions 194, 194, at the opposite ends of the angle-bar 324, are pivotally connected to the upper ends of a pair of rock-arms 195, 195, fulcrumed on the main-frame at 196, 196, and of the same length as the arms 329

Shaft 331 (Figs. 2, 14) has a forwardly-projecting arm 333, which, by means of a ball-and-socket or universal-joint means 334, is connected to the upper end of a link 335 (Figs. 2, 5ª, 14) having its lower end similarly associated by a ball joint with one arm of a bell-crank lever fulcrumed on a shaft 338, on which it is free to turn, between a pair of collars 339, 339 (Fig. 5ª), the depending arm of the bell-crank lever having a roller 341 (Figs. 2, 5ª) designed to travel on the edge of a cam 342 fixed on and rotatable with a back cam-shaft 343, the latter being longitudinally-shiftable by means hereinafter described.

Referring now to Fig. 4, it will be noticed that this back or rear cam-shaft 343 is rotated by means of an electric-motor 344, through intervening, intermeshing gears 345, 346, 347, 348, 349 and 351.

The mechanism so far described is employed for automatically advancing the several numeral markers or scribers 301 to their work and retracting them therefrom as occasion requires.

It now remains to describe the means for causing these scribers to follow the proper courses for marking the correct numerals on the plurality of pieces of hollow glassware in the machine.

Such portion of the mechanism includes a series of properly-shaped cams, and also matrices or forms for more accurately or exactly controlling the paths of travel of such markers in forming or scribing the required figures The cam means cause the scribers or markers to travel paths which would form or engrave figures or numerals on the glass tubes slightly larger than desired, and the governing form or matrix blocks confine or define such paths precisely, thus not necessitating an unduly high degree of accuracy and precision in the manufacture of the cams.

Directing our attention now to the means for moving such markers or scribers up and down to provide the vertical dimensions of the numerals, it will be observed, from Figs. 8 and 14, that shaft 319 has an arm 361 fixed to and projecting forwardly therefrom and having an adjustable extension 362 whereby the height of the numerals may be varied by modifying the length of the arm.

Such combined arm 361—362 is connected by a vertical link 364 with a more-or-less horizontal rod 366, through universal-joint connections 363 and 365, respectively, the rod 366 having a universal mounting at 367 in a bracket 368, and also having a universal connection at 369, referred to hereinbelow.

In order to move the rod 366 up and down to operate the shaft 319 to raise and lower simultaneously the plurality of figure markers or scribers, such rod 366, by a universal-joint connection 370, is joined to a telescopic rod 371 (Figs. 6, 8, 14, 55), the upper, tubular portion of which contains a coiled, expansion spring 372 surrounding a reduced-diameter part of the rod 371 and bearing at its lower end on the shoulder at the junction of the two parts of such rod.

The upper end of this spring presses against an apertured yoke-member 197 (Fig. 55), through the hole of which the rod 371 extends, being equipped on its end with a stop nut 198 which limits the lengthwise expansion of the telescopic rod, but which, in association with the spring, permits its contraction, as will be readily understood.

It is the yield or give in this compound rod which permits the exact formation of the figures, by means of the matrix blocks described in detail below, and without interference by the associated cams.

The lower end of this telescopic rod 371, by means of a ball joint 374, is connected to a sliding block 375 (Figs. 5, 6) designed to reciprocate vertically in a stationary bearing 376, block 375, at its lower end, having a roller 377 (Fig. 5) adapted to coact individually with the right-hand one of any one of a series of duplex cams 378 to 390, inclusive (Fig. 5), and which are successively brought into register automatically with such roller by means described hereinafter.

The left-hand section of each of the dual cams 378-390 is designed at the proper time to co-operate with a roller 391 (Fig. 5) on the lower end of a sliding block 392 vertically reciprocable in the bearing 376 and having a ball-joint connection with a rod 394, which at its upper end has a ball connection 395 with one arm 396 of a bell-crank lever rockingly mounted on a shaft 398, the upper end of such lever having a universal-joint connection 399 (Figs. 7, 14) with a long, horizontal rod 400 (see also Fig. 13) having at its other end a similar, universal-joint association with a bent rod 402 (Figs. 2, 5ª, 13, 14) fitted with a like connection 403 with an end portion of a block 404 fixed on bar 309 (Figs. 7, 9, 10).

As is indicated most clearly in Figs. 9, 11 and 12, the bent, forwardly-projecting rod or bar 402 has a sleeve 405 adjustably clamped thereon so that its longitudinal position on the bar may be varied, such member 405 having a recess for the ball or rounded end 406 of a lever 407 fulcrumed at 408 in a slide 409 adjustably reciprocable on a guide-rib 411 of the bar 201, and adapted to be fixed in the desired position by means of a clamp bar 412 held in the required place by a pair of tightening screws 413, 413.

To hold the end of lever 407 in the cavity or recess of the element 405, a coiled, contractile spring 414 is provided which connects these two parts, and, at the opposite end of the lever, a spring 415 holds the fulcrum ball-member 408 of the lever in place, the spring 415 connecting the lever to a part of the slide 409, as is fully shown.

To give the rear or back end of the bent rod 402 a movement in a definite horizontal plane, such portion of the rod is supplied with an anti-friction roller 416 (Figs. 2, 7, 14) arranged to travel on the top, flat surface of a bracket 417 fixedly mounted on the frame of the machine.

Also, as shown in Fig. 7, rod 366 is joined to the bent rod 402 by a connecting rod 418 having the pivotal connection 369, before referred to, at one end, and a universal joint 419 with the element 402 at the other end.

For the sake of safety, the rod 400, shown in section in Fig. 13, is in part made of two telescoping elements held in extended or elongated relation by a coiled spring 421 encased in one of the members, all as is fully shown in the figure referred to.

From the above description, it should be apparent that the right-hand sections of the several cams 378—390 determine the vertical dimensions of the figures to be marked on the glass tubes, and that the left-hand portions of the same cams regulate the width of such numerals.

The cam means for operating the numeral-scribers for applying the figures to the glassware will now be described.

In the lower portion of the machine (Fig. 3), a skeleton cam-carriage 422 is adapted to travel lengthwise by reason of anti-friction, carrying rollers 423 accommodated in grooves or on tracks 424 of the main-frame.

As is illustrated in Figs. 5 and 5ª, this skeleton carriage, at its opposite ends, has bearings 425 and 426, in which rotates a hollow or tubular shaft 427 on which the series or group of cams 378—390 are mounted, on spider arms 428 (Fig. 3).

By viewing Figs. 3 and 5, it will be perceived that all of these cams, with the exception of the first one 378, are not only of dual or duplex form, as depicted in Fig. 5, but each also consists of two separated parts with two intervening gaps, as presented in Fig. 3.

It may be taken as a general proposition that one-half of each such cam co-operates in the production of one digit of a number, and the other section of the cam coacts in the application of the second digit of the same number.

Stated otherwise, one-half of one such cam corresponds to the production of the figure 4 of the numeral 45, and the other half has relation to the formation of the figure 5 of such numeral 45.

Internally, this hollow shaft 427 has two bearings 429 and 431 (Fig. 5) for the cylindrical portion 432 of an inner shaft, and it also has a square bearing 433 (Fig. 5ª) for a correspondingly-shaped, square part 434 of the same shaft, a reduced, cylindrical journal of the latter finding a bearing in the main-frame of the machine at 435 (Fig. 5ª).

This compound or duplex shaft 432—434 is driven from the gear 349 mentioned above by reason of a large gear 436 (Fig. 5ª) in mesh therewith and keyed or otherwise fastened to the shaft 432—434.

In order to feed the group or series of duplex cams 378—390 along step by step to bring them successively into co-operative relation with the rollers 377 and 391, so that they may perform their functions in sequence or progression, shaft 427 (Fig. 5ª) has fixed thereto a grooved cam 437, the groove of which is adapted and designed to co-operate in succession with thirteen, horizontal, anti-friction rollers 438 mounted in a straight row on a series of studs 439 on a flat lever or hinged plate 411, the hinge of which is indicated at 442 (Figs. 1, 3).

When this flat lever 441 is down in operative position, as indicated in Fig. 5ª, as the shaft 427 is rotated by the turning of its interior shaft 434, by which it is driven, for each revolution of the two shafts, the outer one and its carriage will be stepped along one point, and during the next revolution of the cam 437 it will co-operate with the next roller 438, and thus the carriage and the series of cams thereon will be slid along step by step fully automatically, hence bringing the cams 378—390, one at a time and in sequence, into co-operative relation with the pair of rollers 377 and 391, which assist in the formation of the numerals on the glass tubes.

Shaft 442 is mounted on the inside of the frame in appropriate brackets, in any convenient manner.

Inasmuch as the machine, when marking the plurality of pieces of ware with spaced, graduation lines, applies or scribes 101 of such lines to each such article during their conjoint, lengthwise travel, as occasioned by their common, actuating, wedge mechanism, but marks only 11 numerals opposite some of such graduation lines during the reverse travel of the ware, it is apparent that some means, other than the heretofore described Geneva movement alone, must be used to permit the greater equal spaces between such numerals, and the mechanism for accomplishing this result will now be described.

To this end, therefore, shaft 132 (Figs. 1, 47, 48) of the Geneva movement described above, and carrying the lock and actuating arm 133, has bearings in a long bracket 443 having a yoke end 444 (Fig. 4) hung on and oscillatory on bearings of the shaft 139, whereby such bracket and shaft may be swung up and down without interference with the driving, bevel-gear connection 136—137, the bracket being guided in such movements by a depending finger 445 (Figs. 47, 48), slidable in a fixed bearing 446.

To hold the bracket 443 and its shaft 132 normally up to its work in the position illustrated in Figs. 47 and 48, the bracket has a rod 447 pivoted thereto and equipped with a spring 448 encircling it and bearing at one end on a fixed bracket 449 fastened to the main-frame, and pressing at its other end against a collar or washer 451 on the top end of the rod, this construction, as will be obvious, yieldingly holding the parts in operative relation.

In order to depress or lower the bracket 443 and its shaft 132 so as to unlock the notched wheel 131 of the Geneva movement, whereby it may be turned a greater amount when the numerals are applied to the glassware than occurs when it is actuated by the arm 133 during the graduating operation, a bent link 452 (Figs. 47, 48) is pivoted at 453 to an extension of the bracket, and the upper end of this link is pivoted at 454 (Fig. 3) to the front end of a horizontal lever 455 mounted to oscillate on shaft 338 and carrying at its rear end an anti-friction roller 456 designed to ride on the edge of a cam 457 (Fig. 5) on shaft 343.

A round, ratchet member 458 (Figs. 47, 48) is located on one side of and is integral with the notched wheel 131 of the Geneva movement, this combined member 131—458 being keyed or otherwise fixed to the shaft 129 so that, if either one of them is turned, the shaft is correspondingly rotated.

Such shaft 129 has loosely mounted thereon an oscillatory collar 459 having an outstanding arm 461 to which is pivoted a pawl or dog 462 pressed outwardly by a suitable, leaf spring 463 into co-operative relation with the shoulders or notches of the circular, ratchet member 458.

A stationary bar 460 (Figs. 3, 47, 48) affords a bearing for a sliding rack 464, the teeth of which are in mesh with teeth 465 formed on a portion of the periphery of the hollow shaft or collar 459, so that if the rack is slid back and forth or up and down, the dog or pawl 462 will be operated by such movements, the stationary support 460 having a pin 466 (Fig. 47) in the path of travel of the dog 462 to positively limit the extent of its movement, to preclude overthrow, as indicated by dotted lines in such figure of the drawings.

In order to be able to vary the extent of operative movement of the dog, and thereby modify the degree of turning of shaft 129 at each actuation, a cam 467 is mounted on a slide 468 adjustable in a curved guideway 469 (Figs. 3, 48), and it should be clear from this construction, that by adjusting this cam to different positions, the beginning of the active movement of the pawl on the ratchet teeth may be varied or modified, its final position always being the same, as determined by the stop pin 466, which prevents any excess movement.

Stated somewhat differently, cam 467 is so shaped and adjustable as to prevent the pawl from engaging the ratchet member until its desired position is reached.

Rack 464, in order that it may be actuated, is connected by a link 471 (Figs. 1, 47, 48) to the front end of a lever 473 (Figs. 1, 3, 5), to which it is pivotally connected at 472, the lever being rockable on shaft 338 and carrying at its rear end a roller 474 traveling on the edge of cam 475 on shaft 343 (Fig. 5).

From what precedes, it will be understood that when the pawl 462 is turning the ratchet member 458, the associated wheel 131 and shaft 129, the bracket 443 and its companion parts are depressed or lowered to unlock this portion of the mechanism, but when the pawl or dog 462 retracts or moves back to position for another advance movement, the rounded end portion of arm 133 ascends and co-operates with the adjacent concave surface of one of the teeth or projections of the wheel 131 and locks the latter to prevent turning of the shaft 129 during such reverse movement of the pawl.

Obviously, it is essential to retract the cam-carriage 422 in the lower part of the machine in order that it may repeat its cycle of operations, and to this end it is necessary that the roller-equipped, wide lever 441 be lifted to shift the rollers out of the path of action of their complementary cam 437.

Accordingly, as shown in Figs. 2 and 3, this lever 441 is supplied with a link 476 connected to one arm of a bell-crank lever 477 (Fig. 2) which is mounted to oscillate on shaft 338, and which carries at its lower end a roller 478 arranged for co-operative relation with a part 479 of a multiple cam 481 (Fig. 5ª) mounted on and rotated by shaft 343, the roller being held in proper position by reason of a coiled, contractile spring 482 (Fig. 2) connected to the bell-crank lever and to a projection on an arm 523, described hereinafter.

When, therefore, the part 479 of the cam is in register with the roller, the bell-crank lever will be operated and the roller-equipped lever 449 will be raised or elevated, and when the cam is shifted so that the parts 479 and 478 are not in register, the wide lever 441 will occupy its depressed position.

Cam 481 (Fig. 5ª) also has a wedge or cam surface 483 designed and arranged to coact, under certain circumstances, with a roller 484 on the lower end of a vertically-sliding bar 485 reciprocatory in bearings 486 and 487, and being slid up and down to move the roller vertically by one arm of a bell-crank lever 488—489 (Fig. 5ª) engaging in a recess in the bar, the bell-crank being fulcrumed at 491 on the machine-frame.

As is illustrated conjointly in Figs. 5 and 5ª, the upper end of bell-crank 489 is pivotally connected by a comparatively-long link 492 to one arm of another bell-crank 493—494 rockingly mounted at 495 and acted upon by a coiled, contractile spring 496 in the customary way, the arm 494 of the bell-crank being pivotally connected to a depending bar 497 carrying a roller 498 at its lower end designed to co-operate with four cam surfaces 501, 502, 503 and 504 of a long, horizontal cam-bar 499 (Figs. 3, 5, 5ª, 26) fastened to the top part of the carriage 422 so as to participate in the sliding movements of the latter.

To hold the element 497 in proper position and yet give it freedom of upward movement, it is pivotally connected at 500 to a horizontal link 505 (Figs. 5 and 5ª) hinged at its right-hand end to the machine-frame at 506.

Thus, as the cam-carriage 422 moves along step by step, it will operate the element 497 more or less, depending upon which one of the cam surfaces 501, 502, 503, 504, the roller 498 is co-operating with, and this, of course, determines the vertical position of the roller 484 (Fig. 5ª) to cause it to coact with any one of a plurality of cam surfaces, and in this connection it should be observed that the cam 481 has in addition three other cam surfaces, 507, 508 and 509, at different elevations or distances from the center of the shaft 343, as indicated in Figs. 2, 5ª and 26, the cam faces 483 and 509 being at the same distance from the axis of the shaft.

When roller 484 co-operates with the cam 483, it pushes the shaft 343 and all of the cams mounted thereon to the right as the parts are viewed in Fig. 5ª, and when it coacts with any of the three cams 507, 508 and 509, it slides the shaft in the opposite direction different amounts in order to bring certain ones of the cams, and not others, into action, as will be specified more fully hereinafter in the description of the complete operation of the machine.

The lever or arm 441 carrying the single, straight row of roller-equipped studs, will be raised sufficiently to permit backward movement of the cam-carriage 422 to the right as the parts are viewed in Figs. 5 and 5ª when cam 479 is acting on roller 478, but this happens only when shaft 343 and cam 481 have been shifted to the right as viewed in Fig. 5ª sufficiently, by reason of roller 484 acting on the wedge surface 483, roller 484 being brought to this operative position when roller 498 is on the cam surface 504 (see Fig. 30).

From the preceding, it will be apparent that the cam 499, which travels with the cam-carriage, determines the position of roller 484, and this roller governs the longitudinal, shifting action of the cam-shaft 343, and consequently the operation of the cams thereon.

Having now fully described the mechanism which actuates the wide lever 441 to raise it to permit the rearward travel of the cam-carriage, the means for effecting the retracting, step-by-step movement of the latter will now be presented.

Secured to the top face of the cam-carriage 422 is a ratchet-bar 511 (Figs. 1, 3 and 4), and the appliance includes a long pawl 512 (Fig. 1) rockingly connected at 513 to one arm 514 of a bell-crank lever hinged at 515 in a bracket on the main-frame, another arm 516 of such bell-crank lever having a roller 517 co-operating with a cam 518 on shaft 268, hereinabove referred to.

Pawl 512 (Fig. 1) has a link 519 (see Fig. 4 also) pivotally connected to it, and in like manner associated with a lever 521 (Fig. 1) fulcrumed at 522 on the bell-crank arm 514, an end portion of this lever 521 being located beneath an arm 523 (Figs. 1 and 4) fulcrumed on the frame at 524 and connected by a link 525 (Fig. 4) to bell-crank lever 477, the spring 482 acting on an extension of the arm 523 and tending to rock the latter downwardly, as will be readily understood.

But the cam which controls the movement of bell-crank lever 477 also governs the elevation and descent of the pawl 512 out of and into active relation with the cam-carriage rack 511, cam 518 controlling the lengthwise movement of the pawl to retract the carriage step by step during the time that the spaced graduation lines are being applied to the pieces of glassware.

As has been indicated above, the plurality of duplex cams on the hollow shaft 427 and the associated mechanism will cause the scribers or markers 301 to engrave numerals or other legends on the back or rear, curved surfaces of the several, upright, wax-coated glass-tubes 177, with a certain degree of accuracy, but it has been found to be preferable to supplement the operation of such cams with controlling forms or matrices governing more accurately the movements of the markers, the employment of such matrices or forms not requiring the otherwise needed degree of precision and exactitude in the production or manufacture of the large number of cams involved.

We will now consider the structure and method of operation of these matrix blocks and the correlated part of the mechanism.

The rear end of rod 366 is fitted with an anti-friction roller 531 (Figs. 6, 14) designed and arranged to coact individually with a series of form or matrix blocks 532—544, inclusive (Fig. 6), arranged to be shifted into proper position one at a time for co-operation with such roller.

Each one of these form blocks or matrices has thin ribs 545, 545 (Figs. 5, 16, 17) extended outwardly from its opposite edges, and each such rib or fin has a notch 546 at its top end and a recess 547 in its side, near its lower end.

Such group of form or number blocks is ordinarily supported on a carriage 548 (Fig. 6) between a plurality of spaced, upstanding, angle-bar posts or standards 549, with their fins or ribs 545 projecting outwardly beyond the two series of such standards 549, thus exposing the fins and their recesses or cavities (Fig. 5).

The form-block carriage 548 is supplied with anti-friction, carrying wheels or rollers 551, 551 (Figs. 5, 6) designed and arranged to travel on tracks or rails 552 of a long, stationary bracket 553 (Fig. 6) mounted fixedly on or forming part of the main-frame, this carriage being of skeleton form and having a cross bar 554 (Fig. 6), the lower portion of which detachably fits in a groove 555 in an upward extension on a longitudinally-slidable ratchet-bar 556.

This mounting of the carriage in the manner specified permits it to be readily inserted in and removed from the machine with its load of form blocks, so that when occasion requires a different set of matrix blocks may be quickly placed in the machine in operative relation thereto.

It will be observed that if the ratchet bar 556 is fed along step by step, the form-block carriage will be correspondingly moved and the matrix blocks 532—544 will be brought into operative position in sequence or one at a time.

For the accomplishment of this result, two, pivoted, spring-pressed, oppositely-arranged pawls or dogs 557, 558 (Figs. 6, 22, 23, 24, 25) are arranged for co-operation with the teeth of the ratchet-bar 556, and they are mounted on a slide-bar 559 (Figs. 6, 23, 25), the two ends of which have outstanding, extension rods 561, 562 (Fig. 6) slidable lengthwise in end bearings therein and also slidable through bearings or apertures in abutments 565 and 566, the two rods being surrounded by a pair of coiled springs 563 and 564, bearing at one end against enlargements or collars 560 on the rods, and pressing at their other ends against the two abutments, these two springs being of equal strength, so that, when permitted to do so, they will slide the bar 559 and the two pawls 557 and 558, hinged thereon, to a normal or central position, as shown in Fig. 22.

In order that this pair of pawls may be rendered operative and inoperative at the proper moments to feed the matrix carriage in the one direction or the other the required one step or definite amount, bracket 553 is supplied with two stationary cams 569 and 571 beneath the two pawls (Figs. 23, 24, 25).

The central position of the two pawls is indicated in Figure 22.

When the parts are in the positions illustrated in Figure 23, spring 563 is compressed and rod 561 is pushed to the left so that there is a gap between the stop plate 565 and the two check or stop nuts on the end of rod 561. In this relation of the parts rod 562 is stopped and prevented from following bar 559 to the left by the pair of check or stop nuts on its end bearing against the member 566 and spring 564 remains as before confined between the collar or enlargement 560 of rod 562 and the bearing member 566. Under these circumstances bar 559 has been permitted to slide relatively to the now stationary rod 562 by reason of the telescopic connection between the two.

Of course when the member 559 is shifted to the right, as shown in Figure 24, the reverse condition is present, spring 564 being compressed and spring 563 being uncompressed.

In either instance, when the movement has been completed, the operative pawl will be raised away from the ratchet-tooth by the one or the other cam surface 569 or 571, as the case may be, and as soon as this happens, the one or the other spring 563 or 564 will return the bar 556 and its two pawls to their central or normal position, shown in Fig. 22.

In this way the matrix-block carriage may be fed along step by step in either direction.

It is desirable to lock the ratchet-bar 556, and therefore the form-block carriage, in each of its several positions, and accordingly a spring-pressed plunger 567 (Fig. 25) is mounted in the bracket 553, and its rounded, projecting end is designed to engage or enter any one of a series of cavities or recesses 568 properly spaced along the side of the ratchet-bar (see also Fig. 6).

The machine, as shown in Fig. 6, is constructed to care for a number of form or matrix blocks greater than the number shown in such illustration, and accordingly a filler block 572 is used in one of the notches of the ratchet-bar to limit the travel of the latter, this filler being removed and replaceable in any one of the notches, as circumstances may require.

The carriage and its group of matrix blocks is fed rearwardly step by step by the following co-operating instrumentalities:

The upper end of a lever 573 (Fig. 6) engages a recess in the pawl-slide 559 and is fulcrumed on the shaft 338, having a depending arm 574 (Figs. 3, 5, 6) supplied on its lower end with a roller 575 working with a cam 576 on shaft 343 (Figs. 5, 26).

This cam 576 is the one which, through the pawl-and-ratchet mechanism specified, feeds the form-blocks or matrix-carriage rearwardly step by step during the numbering operation, but, of course, it is also necessary to advance the carriage forwardly, so that it may repeat its cycle of operations, and the following coacting parts have been provided for that purpose.

The lever 573—574 has a short projection 577 (Figs. 3, 6) connected by a bent link 578 to one arm 579 of a bell-crank lever 579—581 (Figs. 3, 5) fulcrumed at 495, the upper end of lever 581 carrying a pin 585 on which slidably rests a flat extension 580 of a bar 582, pivoted to one arm 583 (Fig. 5ª) of a bell-crank lever fulcrumed at 588, the companion arm 584 of such lever being connected by a link 586 (Figs. 2, 5ª) to an arm 587 fixed to and rockable with shaft 515, which is oscillated, as has been explained above, by means of cam 518.

Thus the cam which returns the lower cam-carriage to its initial position also feeds the matrix blocks forwardly to original position, both of these operations occurring simultaneously while the graduation lines are being applied to the several glass-tubes.

The mechanism for elevating the numeral or matrix blocks one at a time and shifting them into position for coaction with the roller 531 will now be presented in detail.

A comparatively-long, upright, skeleton frame 592 is hinged at its lower end at 591 to the rear part of the machine, as shown in Figs. 6 and 17.

Internally, this frame accommodates a pair of separated slides 593, 593, the lower ends of which at 594 are loosely connected to a pair of links 595, 595, which at their upper ends, at 596, are hingedly united to a skeleton frame 597 rockingly mounted on the main-frame at 598 (Fig. 6), coiled, contractile springs 607, 607 affording a yielding connection between the elements 595 and 594, as is fully shown in Fig. 17.

The frame 597 has a short arm 599 (Fig. 6) connected by a link 601 to an arm 602 fixed to a rock shaft 604, which also has another arm 603 carrying a roller 605 bearing on cam 606 on shaft 343 (see Figs. 6 and 26).

At their upper ends, each of the bars 593 has hinged thereto, at 608 (Fig. 17), a bell-crank lever, the short arm 609 of which is supplied with an anti-friction rollers 611 designed to ride on the surface of a friction block 612 pivoted at 614 to a cross-bar of the frame 592 and having a screw-and-slot connection 615 to permit a limited swinging movement of the element 612, these two members 612 being normally spaced apart by an intervening spring 616, and on their outer faces they have slight notches or depressions 617, 617 adapted, under certain conditions, to receive the rollers 611, 611, as shown in Fig. 18.

The longer, upper arms 618, 618 of these two bell-cranks have inturned fingers 619, 619 adapted to enter and leave the notches 547, 547 of the particular form or matrix block in use at that time.

The movements of the parts 618 toward and from each other and also in a vertical direction cause them to engage the particular form-block in register with the frame 592, as shown in Fig. 19, and then slide it up to the operative position illustrated in Fig. 17, a pair of pins 621 in the top of the frame centering and correctly positioning the numeral or matrix block, the arms 618 being slidable and movable to a small amount toward and from each other in narrow guideways 622, 622 formed in the inner surfaces of the frame 592. Below these portions of the frame, the surfaces 623, 623 are finished, and anti-friction rollers 613, 613 on the fulcrum or hinge pins 608, 608, travel thereon.

When any particular form or numeral block on the carriage comes into register with the frame 592, as shown, for example, in Fig. 18, cam 606 causes the two bars 593 to travel upwardly, and, during the first portion of this movement, owing to the slight detention of the rollers 611, 611, in the recesses 617, 617, the upper, hook ends 619, 619, of the two bell-cranks rock in or approach one another, entering the recesses 547, 547 of the form-block, and as the parts 593, 593, continue their upward movement, these hook ends carry the numeral block upwardly into the operative position shown in Fig. 17, the pins 621, 621, acting as positive centering and positioning means for the particular form-block thus raised.

Of course, such a form or numeral block could not be elevated in this manner if the roller 531 were in the plane of travel of the block, and, accordingly, this raising of the numeral or matrix block occurs while the frame 592 is rocked slightly rearwardly on its hinge support 591.

Obviously, then it is necessary to swing such frame forwardly to cause the roller 531 to enter the numeral cavities in the elevated form-block, and this function is accomplished by the following mechanism:

Referring to Fig. 6, it will be observed that the upright, skeleton frame 592 has also across its rear face a plate 624, which has hinged to it at 625, on each side of the member 592, a link 626 (Figs. 5 and 6) pivoted at 627 to a bell-crank frame 628 fulcrumed on a depending section of the bracket 553 at 629, one arm 631 of such bell-crank member being pivotally connected at 632 to a long link 633 hingedly associated at its lower end with an arm 634 fixed to a suitably mounted rock-shaft 636, a coiled, contractile spring 635 connected to the part 634 pulling the latter upwardly, as will be understood.

Shaft 636 also has rigid therewith an arm 637 carrying a roller 638 which is designed to co-operate with any one of a series of smaller cams 639–650, inclusive, secured to and rotatable with the hollow shaft 427 (Figs. 5 and 5a).

It is the purpose and function of these cams not only to rock the frame 592 to cause the roller 531 to enter the particular form or numeral block, but also to move the latter with relation to the roller in an additional manner, depending upon whether or not the numeral or figure cavity in the block has one, two or three active surfaces, as is required to produce numerals on the glassware with more than single lines; that is to say, portions of the numerals have double lines, rather than single lines only, as is indicated in Fig. 53, which shows the finished article.

It will be understood that these cams 639 to 650, inclusive, are shifted individually in succession into position to operate the roller 638 on lever 637, the cams being of different shapes depending upon the particular numeral blocks with which they are to be used.

It is unnecessary to refer to all of the structural characteristics of all of the form or matrix blocks, but it is well to look at one as an example showing the general construction of all, and therefore we will turn our attention to the "45" matrix-block shown in perspective in Fig. 16.

The "4" cavity or form of this block has three active surfaces 651, 652 and 653, at different depths, and in order that the roller 531 may travel on all three of these, it is, of course, necessary to rock the frame 592 slightly by means of the associated cam-operating mechanism, roller 531 moving around the numeral cavity more than once to cooperate with all of its plurality of various-depth cam surfaces.

It should be noted in passing that these form or numeral blocks are upside down, as is required owing to the fact that the glass-tubes to be marked are in inverted position.

In marking the figure or numeral 4 on the glassware, the roller 531 first travels on the innermost surface 651, then on the outermost surface 653, and subsequently on the intermediate surface 652, which action is occasioned by the cam surfaces 654, 655 and 656, respectively, of the cam 642 (see Fig. 15).

The duplex cam 382 tends to carry the roller 531 beyond the contour of the cavity of the numeral or form block, but the roller is held to its proper path of travel by the surfaces 651, 652, 653, as the case may be, the interposed springs, particularly springs 660 and 661 (Figs. 5 and 6) preventing damage to the mechanism and affording the required yield in the construction so that the parts may perform their correct functions.

The spring 660 referred to its connected at its lower end to the frame and at its upper end to the rod 371, and under certain circumstances the roller 377 may not ride on the cam surface directly beneath it, being held slightly elevated by the part 198 (Fig. 55). Stated otherwise, the cam would permit the roller to descend further, but it is not allowed to do so.

Spring 661 connects the part 396 to the frame of the machine and performs a corresponding function.

In the operation of the machine, one-half of the duplex section of one of the cams 378 to 390 causes the roller 531 to coact with one of the figures of the matrix block, and the other curved section of the same cam makes it cooperate with the other numeral of the matrix block; the frame 592, of course, rocking properly to permit the roller to enter and leave the numeral recesses as may be required.

Referring to Fig. 54, it will be seen that the glass-tube bears a legend "9GR".

The "9" of this legend is formed by the duplex cam 378, which is only half a cam, in connection with the form block 532, which has three cavities, "9", "G" and "R".

The two letters "GR" are formed by the complete or two-part, duplex cam 379, one arcuate part of the cam forming the "G" and the companion arcuate section forming the "R", all, of course, in association or cooperation with the block 532.

The double, duplex cam 381 causes the marking of the "50" on all of the glass tubes, and so on with the remainder of the cams; the companion cams 639 to 650, inclusive, of course, being brought progressively and at the proper time into position to carry out their functions, as has been indicated above.

In order to shift the rear cam-shaft 343 lengthwise to move cam 479 out of the plane of roller 478 temporarily, to leave lever 441 and its rollers down to cause the longitudinal travel of the cam-carriage 442 during the numbering operation, gear 351 (Figs. 26, 5ª) has a short cam 657 on its side, designed to work with a fixed, anti-friction roller 658 mounted on the main-frame (see also Fig. 4).

Of course, when the cam passes beyond the roller, the shaft 343 remains in the position in which it has been put until moved therefrom by cams 507, 508, 509 and 483 cooperating with the roller 484.

We will now consider the stopping mechanism of the machine.

One roller 120 (Figs. 4 and 5ª), when it reaches its limit of upward movement, passes under one arm 671 of a bell-crank lever fulcrumed at 672, the lower arm 673 thereof being located beside a depending link 674 hinged at its upper end at 675 to a lever 676 fulcrumed at 677.

The lower end of such hanging link 674 is notched at one side at 678 (Fig. 4), and is adapted under certain conditions to overlie a lever 679 (Fig. 5ª) fulcrumed at 681 and having an arm 682 fitted with a roller 683 arranged to co-operate with the one high part 685 of cam 267, the latter having also nine, alternating, lower parts 686 and 687, corresponding to the short and intermediate lengths of the spaced, graduation lines, the part 685 corresponding to the long, 10th line extending almost all the way around the glass tube, a projection 684 from the main-frame below lever 679 preventing the roller of the latter from bearing on any other surface of the cam than the single, high one 681, and, of course, when this comes under the roller it causes a rocking of the lever 679 and at proper time an upward shifting of the link 674.

When arm 673 is rocked over, it pushes link 674 into the path of movement of lever 679, but otherwise it is out of such path and is held out by a spring 688 (Fig. 4) connected thereto and to a suitable support.

When link 674 is thus forced up after the completion of the final 10th line, that is to say, the 101st graduation line, it rocks lever 676 upwardly, disengaging a trigger part thereof 689 (Figs. 50 and 51) from the end of a slide rod 691 pressed by a spring 692 toward the trigger.

Fig. 51 shows the trigger locking the rod, and Fig. 50 illustrates the rod as unlocked by such upward movement of the combined parts 676 and 689.

The projection 693 on the slide rod 691 (Figs. 50 and 51) coacts with the short end 694 of a bell-crank handle 695 fulcrumed at 696.

When such handle is in the operative position shown in Fig. 51, with the spring 692 under compression and the slide 691 locked by the trigger or catch 689, the handle holds closed a self-opening electric-switch 697 governing the circuit of the electric-motor 143 (see also Fig. 52), which, as has been explained above, operates the graduation-line marking mechanism.

When the electric-switch 697 is thus closed, a similar electric-switch 698, controlling the circuit of the electric-motor 344, which operates the number-applying part of the machines, is held open by the end of rod 691, thus assuring that when either switch is closed the other must be open, hence eliminating any possibility of both motors being energized at the same time.

When the handle 695 is swung to the left, it stores up energy in spring 692 and causes the latching of the slide rod 691, closing switch 697 and opening switch 698, and the line-marking mechanism will operate to graduate the tubes until the cam part 685 works the trigger as explained, thereby releasing the spring 692, which rocks handle 695 to open switch 697 and close switch 698.

This handle is thus automatically swung to open switch 697 when the tube-carriage is at its uppermost position, hence stopping the line-marking mechanism with the carriage in the relation noted.

The circuit of the numeral-applying motor 344 has in it two electric switches 699 and 701 in parallel or multiple relation (Figs. 4, 26, 50, 52), switch 699 being manually operated by a lever-handle 702 (Fig. 4) connected by a link 703 to the sliding shaft 704 of the switch, which is normally held open by spring 705.

Switch 699 is ordinarily only closed by hand momentarily to start the numbering motor 344, and then switch 701 is closed automatically and maintained closed the required period, and then opened automatically.

This is accomplished by the following mechanism:

Rod 706 of switch 701 (Figs. 4, 5ª, 26) is connected to a lever 707 fulcrumed at 708 and carrying a roller 709 arranged to be operated by a portion of cam 657.

As soon as gear 351 begins to turn because of the hand-closing of switch 699, the cam moves out of register with roller 709 and permits the closing of switch 701, which keeps the motor 344 in action, and, when, during the rotation or sliding of gear 351 the cam engages the roller, switch 701 is opened and the motor stopped, with the resulting cessation of operation of the entire mechanism.

As is shown in Fig. 52, a hand-operated master-switch 710 is located between the circuits of both motors and the electric, main wires 711.

In order that shaft 139 may, as occasion requires, be turned by hand, as well as rotated by the motor 143, the machine is supplied with an upper, end shaft 713 (Fig. 4) having a hand wheel 714 (Figs. 1 and 4) at its front end, in a convenient position, such upper shaft being operatively connected to the lower shaft 139 by a sprocket-wheel-and-chain construction 715 of ordinary construction.

Operation: Assuming that the twelve, glass, tubular blanks, which necessarily vary slightly in internal caliber, owing to the impossibility of drawing the glass-tubing from which they are made with precise exactitude, have been individually calibrated by hand with carefully-measured volumes of liquid, and that temporary, first and final test or guage lines, corresponding to the "0" and "50" graduation lines 716 and 712 (Fig. 53), respectively, of the finished product, have been applied to all of them, and that such several, glass members have been coated externally with translucent wax, through which such preliminary lines may be viewed, and, assuming that the front hand-wheel 714 has been turned to the left to back up the cams partially and bring the several needles or line markers 217, 217, into suitable sighting positions, the roller 243 being between the inner pair of cams 244, 248, and, taking for granted that the attendant has closed electric-switch 699 of the legend-marking electric-motor 344 and has also closed the master-switch 710, and that the hollow cam-shaft 427 has completed an idle, one-half revolution, during which action the legend or numeral markers 301, 301 idly came on to the ware and receded again, and, assuming that the workman has opened the master-switch, thus stopping the movement of all parts, then, with the tube-carriages 162, 162 in their highest positions, the twelve tube-blanks are inserted in inverted relation, with their flaring mouths 178, 178 disposed downwardly and supported on the conical heads 179, 179.

To permit such introduction of the tubes, it is, of course, necessary to raise the top, clamping, recessed heads 169, 169 against the downward-pressing actions of their associated springs 172, 172, which, thereafter, maintain such members pressed down firmly against the upper ends of the tubes.

Then the pointers 176, 176 are pushed down in succession as far as is permitted, and the handles 189, 189 are turned in sequence until the "0" test or guage line 716 of the corresponding tube is in exact register with its pointer 176, whereupon the clamps 192, 192 are tightened by their handles 193, 193, to maintain the adjustments just made.

Thereupon, the several screws 147, 147 are adjusted in progression, by turning their heads 148, 148, to bring the "50" temporary, gauge line, corresponding to the final "50" line 712 of the congruent glass-tube into precise register with the companion, graduation line-scriber 217.

Then, the operator turns all of the handles 167, 167 and their associated glass-tubes to the left until the former engage their stops 168, 168, thus bringing all of the tubes into proper, angular position for the application thereto of any suitable legend, in the present instance "9GR", which, as will be noted from Fig. 54, is not in register with the longitudinal row of numerals 0–50.

During the inactive, one-half revolution of the hollow cam-shaft 427, the back cam-shaft 343 was also turned one-half revolution, their respective driving-gears 436 and 351 (Fig. 5ª) being of the same diameter and meshing with their common, relatively-long, driving pinion 349.

During the period of such one-half revolution, the fixed roller 658, by coaction with the edge of cam 657 on the side of gear 351, pushes the cam-shaft 343 lengthwise, thereby shifting cams 479 and 657 out of register with rollers 478 and 709 (see Figs. 26, 27.)

Thus, through lever 477, the stud-equipped, wide arm 441 is permitted to remain down in position to cause the feeding of the cam-carriage 422 along, through the action of cam 437, and the electric-switch 701 is automatically closed, and will not again be opened until the legend and numeral applying operations have been completed.

Under these conditions, cam 457, which throws the Geneva movement into and out of action, cam 475, which moves the wedge, numbering mechanism, and cam 576, which feeds the cam-carriage along, are all inoperative because out of alignment with their respective rollers, but cam 342, which moves the markers 301, 301 toward and from the ware, and cam 606, which feeds the form or matrix blocks up and down, are in operative relation to their associated, mechanical elements.

Upon again closing the master-switch 710, and during the next one and one-half revolutions of the two cam-shafts 427 and 343, the legend "9GR" is scratched through the wax on all of the twelve tubes, the single, matrix block 532 being employed for this purpose, which has in it the three form cavities "9", "G" and "R".

During the first one-half turn of such one and one-half rotation of the cam-shafts, the figure "9" is marked on the tubes from the matrix block, which is already up at that time.

Then such block 532 goes down and ascends again, and while thus elevated, and during the remaining complete revolution of such one and one-half rotation, the letters "G", "R" are applied individually, but yet simultaneously, to all of the tubes, whereupon the matrix block descends.

The cam-carriage, of course, is fed along one step for each complete revolution of either cam-shaft, and it was advanced one such step to bring the first complete cam 379 into operative position while the form or matrix block 532 was descending after the marking of the numeral 9, but, of course, before the application of the "GR".

The matrix-block carriage, however, did not move, and the same block is elevated a second time because the carriage-actuating cam 576 is not then operatively in register with its roller 575.

Thus, during two complete revolutions of the cam-shafts, the legend "9GR" is applied to all of the tubes with the employment of a half, duplex cam 378, a whole or double, duplex cam 379, and a single, three-form ("9GR"), matrix-block 532.

Inasmuch as this is the only triple-cavity matrix-block so used, it is obviously necessary to set the matrix-block carriage into operation during the subsequent numbering action.

To this end, during the full revolution of cam-shaft 343, after its specified, initial, idle, one-half revolution, roller 484, whose position is then controlled by cam 502, acts through cam 507 to force the cam-shaft over lengthwise one more step, as shown in Fig. 28, thus bringing the single, wide-projection of cam 576, shown in full lines, into operative relation with roller 575.

At the end of such second, complete revolution of the cam-shafts, the operator opens the master-switch temporarily, stopping the operation of the machine, and during such cessation of action, he turns all of the handles 167, 167, and their associated, glass tubes, to the right, into correct position for the application to the latter of the rows of numerals.

Then he closes the master-switch again, and during the continued action of the machine, the numeral blocks are individually, in succession, shifted temporarily into operative position and the numerals "50", "45", "40", "35", "30", "25", "20", "15" and "10" are marked in sequence on the tubes, each such number being executed simultaneously on all of the tubes.

During this action, the cam-carriage 422 is stepped along at intervals, bringing the cams of the two groups 378—390 and 639—650 progressively into operative positions for the performances of their functions.

While these numbering operations are taking place, the cam-shaft 343 is in the position shown in Fig. 29, by reason of the cam surface 503 having caused roller 484 to cooperate with the cam 508, causing the shaft 343 to be moved lengthwise to such location.

Under these circumstances, the wider projections of the cams 342, 457, 475 and 576 are active.

Cam 342 causes the numeral-markers to move toward and from the ware, so that there will be no scratching of the latter while it is shifted lengthwise to provide the spaces between the numerals.

Cam 457 throws the locking Geneva-movement into and out of operation.

Cam 475 works the ratchet-mechanism for advancing the multiple-wedge carriage to feed the tubes down the required amounts intermittently, that is to say, at each actuation, a distance corresponding to ten graduation lines (not yet applied).

Cam 576 advances the cam-carriage 422 along one step for each revolution of the cam-shafts 343 and 427.

Cam 606 feeds the matrix-blocks up and down.

Cams 639–650 rock the frame in which the active matrix-block is then located, to bring the various-depth cam-surfaces of the matrix-cavities into action.

In order to conserve time, the succeeding numeral "5" is marked on the ware during a one-half revolution of the cam-shaft 343 (one-half of cam 390 then being in action), instead of a whole revolution, as was used during the application of the two-figure numerals "50" to "10", inclusive, and the remaining "0" is marked on the ware during the immediately succeeding half revolution of such back cam-shaft 343 (the other arcuate half of cam 390 then being operative), each, however, the "5" and the "0", having its own separate or individual matrix-block.

To accomplish this desirable result, it is necessary to double up some of the previously-mentioned operations, which is accomplished by moving the cam-shaft to its extreme left position, as shown in Fig. 30.

During the intermittent, lengthwise movement of the carriage 422, the cam-surface 504 is ultimately brought into action to cause roller 484, by co-operation with cam 509, to shift cam-shaft 343 one more step to the left into the position shown in Fig. 30.

When such cam-shaft is in that position, and, due to the fact that each cam 457, 475 and 576 has an additional or supplemental, narrow projection diametrically opposite its main, wider projection, the former being now for the first time active, and due also to the fact that the right-hand portion of cam 606 has two recesses one hundred and eighty degrees apart, both of which are now operative, the operations performed by these several cams will occur twice as often as previously, and both numerals "5" and "0" will be marked on the ware during the single revolution of the cam-shaft.

During the marking of the "0's" roller 484, by engaging cam 483, will shift the cam-shaft 343 to the right to its original position (see Fig. 26), causing (a) cam 479, through its roller, to elevate the arm 441 and its plurality of rollers, thus permitting the cam-carriage 422 to be moved back to original position by its pawl-and-ratchet mechanism during the subsequent graduating operation, and (b) the opening of electric-switch 701, thus stopping the motor 344, the cam 657 then being in register with the fixed roller 658, so that a repetition of the specified actions will occur during the numbering of the succeeding set of tubes.

After the numerals "0" have been applied, the tube-carriage will be at the bottom of its stroke.

It is now time to mark the graduation lines on the tubes during the intervals between their intermittent, upward movements occasioned by the interrupted travel of the wedge-carriage.

During the graduation-line application, the cam-carriage 422, as just indicated, and the matrix-block carriage 548 are brought back automatically to their initial positions step by step through their respective ratchet-mechanisms provided for that purpose.

While the machine was graduating the preceding, as distinguished from the present, set of glass-tubes, the last operation of the line-scribing needles was to make the final lines (in register with the numerals 50) which extend almost all the way around the tubes.

In starting to graduate the group of tubes now in the machine, the first lines, corresponding to the "0" position, should be of the same length as the final ("50") lines on the antecedent set of tubes, but the machine is not constructed to repeat the application of lines of that length directly one after another, and, accordingly, it is essential to re-set the machine by hand to secure the required repetition.

It will be recalled that, prior to the adjustment of the tubes in the machine, when they were first inserted, the line-marking needles 217, 217 were moved to sighting position by the turning of handle 714, but that movement was not sufficient to back up the mechanism adequately so that the first marks made by the needles will be of full length.

Therefore, the workman now turns handle 714 backward still further until the parts have been thus re-set by hand to make full-length, first lines.

The operator now swings handle 695 to the left, thereby closing the electric-switch 697 of the graduation-line applying motor 143 and latching spring 692 under compression or with stored power, and he also closes the master-switch 710.

The operation of the motor causes the Geneva-movement to turn the shaft 123 step by step and the pair of cams 122, 122 thereon, push the wedge-carriage 109 up its supporting, inclined tracks or rails in equivalent manner, thus feeding all of the tubes upwardly simultaneously, possibly varying amounts, depending on the previous adjustments of their separate wedge-bars 144, between the line-marking executions, hence automatically compensating or making allowances automatically for the differences in the sizes of the bores of the tubes.

During the periods of rest of the tubes, the corresponding graduation-lines are marked on all of them at the same time, the lengths of the lines being controlled by the three pairs of cams 244—248, 245—249 and 246—251, between which the intermediate roller 243 is shifted, as occasion requires, by the action of cam 267, the inner cams 244—248 causing the longest lines, the middle cams 245—249 producing the shortest lines, and the outer cams 246—251 creating the lines of intermediate length.

The detailed manner in which the needles mark the lines by their operating mechanism has been fully presented hereinbefore, and need not be repeated, but it should be observed that the roller 243 is shifted back and forth between its pairs of cams during the reversal movements of the needles, thus not interfering with the correct action of the latter.

At the proper time, which, however, insures completion of the marking of the final lines, the roller 120 on the wedge-carriage, by engagement with the bell-crank lever 671, 672, shifts the rod 674 over into the path of movement of the arm 679, and at the proper moment the upward movement of the member 674 unlatches the slide bar 691, and the expansion of spring 692 rocks the handle 695 to the right, permitting the automatic opening of the electric-switch 697, thus shutting off the electric-current to the motor 143 and stopping the machine, after which the workman can open the controlling master-switch 710.

While the graduation lines are being marked on the tubes, the wedge-carriage is moved definite amounts at each graduation, corresponding to the spaces between adjacent lines, but when the numbering operation is taking place, such wedge-carriage at each action is moved ten times that distance, so that the numbers are opposite only the tenth lines.

By turning to Fig. 47 of the drawing, it will be perceived that, by reason of the pawland-ratchet mechanism, the shaft 129 is turned only five times as far as when it is operated step by step by the Geneva movement, and consequently it is necessary to double the ratchet movement in some other part of the machine to accomplish the required result.

This is done through the shape of cam 122, shown in Figs. 2 and 3.

Such cam on its right, as thus illustrated, has a low point, and on its left, has its high point. Around the lower part of the cam these two points are two hundred and forty degrees apart, whereas around the upper part of the cam such two points are spaced from one another one hundred and twenty degrees.

The two hundred and forty degree section of the cam is used during the line-graduating operation, whereas the one hundred and twenty degree section of the cam, which is twice as steep as the two hundred and forty degree portion, is employed during the numbering.

The ratchet mechanism shown in Fig. 47, combined with the employment of the steeper portion of the cam 122, gives the proper spaces between numerals corresponding to the spaces between the graduation-lines.

Those skilled in this art will readily understand that the particular embodiment of the invention illustrated and described in detail is merely by way of example only, as indicating a present, preferred incorporation of the same in physical form, but the mechanism depicted may be modified in more or less radical degree without departure from the heart and essence of the invention as defined by the appended claims, and without the sacrifice of any of its material benefits and advantages.

I claim:

1. In a graduating-appliance of the character described, the combination of means to support the ware, means to apply spaced graduation-lines on the ware while thus supported, and means to apply legends automatically on the ware while thus supported at positions corresponding to those of a plurality of such graduation-lines.

2. In a graduating-appliance of the character described, the combination of means to support the ware, means to apply spaced graduation-lines on the ware while thus supported, means to adjust said means whereby to vary the spaces between said lines, and means to apply legends automatically on the ware while thus supported at positions corresponding to those of a plurality of such graduation-lines and in conformity with the adjusted spacing of the latter.

3. In a graduating-appliance for hollow ware, the combination of means to support the ware, and automatic means for applying legends on the ware while thus supported spaced apart distances corresponding to the internal caliber of the ware.

4. In a graduating-appliance for hollow ware, the combination of means to support the ware, automatic means to apply graduation-lines on the ware while thus supported spaced apart distances corresponding to the internal caliber of the ware, and automatic means to apply legends on the ware while thus supported spaced apart distances corresponding to the internal caliber of the ware.

5. In a graduating-appliance of the character described, the combination of means to support the ware to be graduated, means to mark graduation lines on said ware while thus supported, means to move said ware supporting and marking means relatively to one another to produce spaces between the lines, and means to apply legends automatically on the ware while thus supported at positions corresponding to those of a plurality of such graduation-lines.

6. In a graduating-appliance for hollow ware, the combination of means to support the ware, means to apply legends automatically on the ware thus supported, means to move said ware supporting means and said legend-applying means relatively to one another to provide spaces between the legends, and means to adjust said moving means to permit said legends to be spaced apart in conformity with the internal caliber of the ware.

7. In a graduating-appliance for hollow ware, the combination of means to support the ware, means to mark graduation-lines on the ware while thus supported, means to mark legends on the ware automatically while thus supported, adjustable means to move the ware supporting and marking means relatively to one another step by step in conformity with the internal caliber of the ware, means to operate said adjustable means to provide spaces between the successive graduation-lines, and means to operate said adjustable means to provide spaces between said legends.

8. In a graduating-appliance for hollow ware, the combination of means to support the ware in substantially-vertical position, means to mark graduation-lines on the ware while thus supported, means to mark legends on the ware automatically while thus supported, means to feed the ware supporting means downwardly step by step during the application of the legends, and means to feed the ware supporting means upwardly step by step during the application of the graduation-lines.

9. In a graduating-appliance for hollow ware, the combination of means to support a plurality of pieces of ware to be operated upon, means to mark legends automatically simultaneously on said pieces of ware while thus supported, means to move said pieces of ware and legend-marking means relatively to one another to provide spaces between the legends, and means to adjust said moving means to permit said spaces to conform to the internal calibers of the pieces of ware.

10. In a graduating-appliance for hollow ware, the combination of means to support a plurality of pieces of ware to be operated upon, means to mark legends automatically simultaneously on said pieces of ware while thus supported, individual means to move said pieces of ware and legend-marking means relatively to one another to provide spaces between the legends, means to adjust said individual moving means separately to permit the production of spaces between the legends in conformity with the internal caliber of the corresponding piece of ware, and means to operate said individual moving means simultaneously.

11. In a graduating-appliance for hollow ware, the combination of means to support a plurality of pieces of ware to be operated upon, means to mark graduation-lines automatically simultaneously on said pieces of ware while thus supported, means to mark legends automatically simultaneously on said pieces of ware while thus supported, individual means to move said pieces of ware relatively to said graduation-line and legend-marking means to provide spaces between the lines and between the legends, means to adjust said individual moving means separately to permit the production of spaces between the lines and between the legends in conformity with the internal caliber of the corresponding piece of ware, means to operate said individual moving means simultaneously to provide the spaces between the graduation-lines, and means to operate said individual moving means simultaneously to a greater extent at each actuation to provide the spaces between the legends.

12. In a graduating appliance of the character described, the combination of means to support the ware, a marker to apply a legend on the ware, means to operate said marker to cause it to trace a path approximating the legend, and means governing the exact path of travel of said marker to cause it to produce the precise legend on the ware.

13. In a graduating-appliance of the character described, the combination of means to support the ware, a marker to apply a legend on the ware, cam means to operate said marker to cause it to trace a path approximating the legend, and matrix means governing the exact path of travel of said marker to cause it to produce the precise legend on the ware.

14. In a graduating-appliance of the character described, the combination of means to support the ware, a marker to apply a legend on the ware while thus supported, means to cause said marker to trace the legend automatically, and automatic means to cause said marker to approach and bear on the ware during the application of the legend and to recede from the ware after such application.

15. In a graduating-appliance of the character described, the combination of means to support a plurality of pieces of ware, a legend-marker for each piece of ware, and automatically-acting means common to all of said markers to cause them to apply the same legend simultaneously on all of the pieces of ware while thus supported.

16. In a graduating-appliance of the character described, the combination of means to support a plurality of pieces of ware, a legend-marker for each piece of ware, and automatically-acting means common to all of said markers to cause them to apply a series of legends on the pieces of ware while thus supported, each legend being applied simultaneously on all of the pieces of ware.

17. In a graduating-appliance of the character described, the combination of means to support a plurality of pieces of ware, a legend-marker for each piece of ware, and automatically-acting means, including a single legend-matrix, common to all of said markers to cause them to apply the same legend simultaneously to all of the pieces of ware while thus supported.

18. In a graduating-appliance of the character described, the combination of means to support a plurality of pieces of ware, a legend-marker for each piece of ware, automatic means to simultaneously operate all of said markers to cause them to trace a path approximating the legend, and means common to all of said markers governing the exact paths of travel of said markers to cause them to produce the precise legend.

19. In a graduating-appliance of the character described, the combination of means to support a plurality of pieces of ware, a legend-marker for each piece of ware, automatic cam-means common to all of said markers to cause them to simultaneously trace paths approximating the legend, and automatic matrix-means common to all of said markers and acting automatically to govern the exact paths of travel of said markers to cause them to produce the precise legend.

20. In a graduating-appliance of the character described, the combination of means to support a plurality of pieces of ware, a legend-marker for each piece of ware, automatic means common to all of said markers to cause them to trace paths approximating the legend, automatic means common to all of said markers governing the exact paths of travel of said markers to cause them to apply the precise legend simultaneously on all of the pieces of ware, and automatic means to cause said markers to approach and bear on the ware during the application of the legends and to recede from the ware after such application.

21. In a graduating-appliance of the character described, the combination of means to support the ware, a legend-marker, means to move the ware support and marker relatively to one another to provide spaces between the legends, and means to cause said marker to trace a series of legends on the ware, including a group of legend-matrices and means to bring such matrices automatically individually in succession into cooperative relation with said marker.

22. In a graduating-appliance of the character described, the combination of means to support a plurality of pieces of ware, a legend-marker for each piece of ware, means to move said pieces of ware and legend-markers relatively to one another to provide spaces between the legends on each piece, and means to cause each of said markers to trace a series of legends on its corresponding piece of ware, including a group of legend-matrices and means to bring such matrices automatically individually in succession into co-operative relation with all of the markers simultaneously, whereby each legend of the series is applied to all of the pieces of ware simultaneously through a corresponding single matrix.

23. In a graduating-appliance of the character described, the combination of means to support a plurality of pieces of ware, a legend-marker for each piece of ware, individual means to move said pieces of ware and legend-markers relatively to one another to provide spaces between the legends, means to adjust said individual means separately to permit the production of spaces between the legends in conformity with the internal caliber of the corresponding piece of ware, means to operate said individual moving-means simultaneously, means to cause each of said markers to trace a series of legends on its corresponding piece of ware, including a group of legend-matrices and means to bring such matrices automatically individually in succession into co-operative relation with all of said markers simultaneously, whereby each legend of the series is applied to the pieces of ware simultaneously through the corresponding single matrix.

24. In a graduating-appliance of the character described, the combination of means to support the ware, a marker adapted to apply legends on the ware, means to move the ware and said marker relatively to one another to provide spaces between the legends, a carriage, a plurality of legend matrix-blocks on said carriage, a frame, means to feed said carriage along to bring said blocks individually into register with said frame, means to shift the registered block from said carriage to said frame and to restore it to the former, means to actuate said marker co-operating with the shifted legend matrix-block, and means to move said latter means and the shifted matrix-block into and out of coactive relation.

25. In a graduating-appliance of the character described, the combination of means to support a plurality of pieces of ware, a legend-marker for each piece of ware, means to move said pieces of ware and said markers relatively to one another to provide spaces between the legends, a carriage, a plurality of legend matrix-blocks on said carriage, a frame, means to feed said carriage along to bring said blocks individually into register with said frame, means to shift the registered block from said carriage to said frame and to restore it to the former, means co-operating with the shifted legend matrix-block to actuate all of said markers simultaneously, and means to move said latter means and the shifted matrix-block into and out of coactive relation.

26. In a graduating-appliance of the character described, the combination of means to support the ware, a marker adapted to apply legends to the ware, means to move the ware and said marker relatively to one another to provide spaces between the legends, a carriage, a plurality of legend matrix-blocks on said carriage, a frame, means to feed said carriage along to bring said blocks individually into register with said frame, means to shift the registered block from said carriage to said frame and to restore it to the former, some at least of said matrix-blocks having legend-forms of different depths to provide multiple-line legends, means co-operating with the shifted matrix-block to actuate said marker, and means to move said latter means and said frame relatively to one another to bring the different-depth portions of the matrix-block into action.

27. In a graduating-appliance of the character described, the combination of means to support a plurality of pieces of ware, a legend-marker for each piece of ware, means to move said plurality of pieces of ware and said markers relatively to one another to provide spaces between the legends, a carriage, a plurality of legend matrix-blocks on said carriage, a frame, means to feed said carriage along to bring said blocks individually into register with said frame, means to shift the registered block from said carriage to said frame and to restore it to the former, some at least of said matrix-blocks having legend-forms of different depths to provide multiple-line legends, means co-operating with the shifted matrix-block to actuate said markers simultaneously, and means to move said latter means and said frame relatively to one another to bring the different-depth portions of the shifted matrix-block into action.

28. In a graduating-appliance of the character described, the combination of means to support a plurality of pieces of ware, a legend-marker for each piece of ware, means to move said pieces of ware and legend-markers relatively to one another to provide spaces between the legends, means to adjust said moving means individually to permit said spaces to conform to the internal calibers of the pieces of ware, a carriage, a plurality of legend matrix-blocks on said carriage, a frame, means to feed said carriage along to bring said blocks individually into register with said frame, means to shift the registered block from said carriage to said frame and to return it to the former, some at least of said matrix-blocks having legend-forms of different depths to provide multiple-line legends, means co-operating with the shifted matrix-block to actuate all of said markers simultaneously, and means to move said latter means and frame relatively to one another to bring the different-depth portions of the matrix-block into action.

29. A legend matrix-block having a form portion with matrix cam surfaces in different parallel planes, whereby the block may be used to produce a double-line legend.

30. A legend matrix-block having a form cavity with matrix cam surfaces of different depths, whereby the block may be used to produce a double-line legend.

31. In a graduating-appliance of the character described, the combination of means to support the ware with capacity for angular adjustment about its own axis, and means to mark legends on the ware while thus supported, the capacity for angular adjustment of the ware permitting the legends to be applied thereon at different angular positions.

32. In a graduating-appliance of the character described, the combination of means to support the ware, means to apply a plurality of legends on the ware while thus supported, means to apply spaced graduation-lines to the ware while thus supported, and means to restore at least a portion of the legend-applying mechanism to its original position during the subsequent graduation-line applying operation.

33. In a graduating-appliance of the character described, the combination of means to support the ware in inverted position, and means to apply a plurality of spaced legends thereon automatically while thus supported.

34. In a graduating-appliance of the character described, the combination of means to support a plurality of pieces of ware in inverted position, and means to apply a plurality of spaced legends on each piece of ware automatically while thus supported, the corresponding legends being applied to the pieces of ware simultaneously.

35. In a graduating-appliance of the character described, the combination of means to support the ware, means to apply a series of legends on the ware while thus supported, means to automatically stop the machine when the application of such series of legends has been accomplished, means to mark a series of spaced graduation-lines on the ware while thus supported, and means to stop the machine automatically after the final graduation-line has been marked on the ware.

36. In a graduating-appliance of the character described, the combination of means to support the ware, a marker adapted to apply legends on the ware, means to move the ware support and marker relatively to one another to provide spaces between the legends, a plurality of legend matrix-blocks, means to bring said blocks individually into operative position, means actuating said marker and co-operating with the operative matrix-block, said matrix-blocks having different numbers of forms, and means automatically modifying the operation of the appliance to compensate for the different numbers of legend forms on the blocks.

37. In a machine of the character described, the combination of a ratchet-bar, a slide-bar, a pair of oppositely-arranged pawls on said slide-bar adapted to co-operate individually with the ratchet-bar to feed the latter in either direction, means to reciprocate said slide-bar, means to release the active pawl from the ratchet-bar after it has operated from the latter, and automatic means to move the slide-bar and its pawls to central position after each actuation of the ratchet-bar.

38. In a graduating-appliance of the character described, the combination of a support, an inner sleeve in said support, an outer sleeve in said support, a friction-brake acting on said outer sleeve, means to support the ware inside of said sleeves, a gear to turn said inner sleeve, a sliding rack in mesh with said gear, means to slide said rack, a scriber hingedly mounted on said outer sleeve, a spring tending to rock the scriber to the ware, a scriber-controlling member hingedly mounted on said outer sleeve and governing the position of the scriber, and a lug-and-recess connection between said inner sleeve and said member, whereby during the initial movement of the rack and the turning of the inner sleeve said member is rocked to permit the scriber to engage the ware before the scriber begins its marking operation by the turning of the outer sleeve.

39. In a graduating-appliance of the character described, the combination of a support, a plurality of inner sleeves in said support, a corresponding plurality of outer sleeves in said support, friction brakes acting on said outer sleeves, means to support a corresponding number of pieces of ware inside of said sleeves, a gear to turn each of said inner sleeves, a sliding rack in mesh with all of said gears, means to slide said rack, a scriber hingedly mounted on each said outer sleeve, a spring tending to rock each scriber to its corresponding piece of ware, a scriber-controlling member hingedly mounted on each of said outer sleeves and governing the position of the corresponding scriber, and a lug-and-recess connection between each of said inner sleeves and its said corresponding member, whereby during the initial movement of the rack and turning of the inner sleeves said members are rocked to permit the scribers to substantially simultaneously engage the pieces of ware before the scribers begin their marking operation by the turning of the outer sleeves.

40. In a graduating-appliance of the character described, the combination of a support, an inner sleeve in said support, an outer sleeve in said support, a friction brake acting on said outer sleeve, means to support the ware inside of said sleeves, means to turn said inner sleeve, a scriber movably mounted on said outer sleeve, a scriber-controlling member movably mounted on said outer sleeve and governing the position of the scriber, and an operating connection between said inner sleeve and said member, whereby during the initial movement of the inner sleeve said member is moved to permit the scriber to engage the ware before the scriber begins its marking operation by the turning of the outer sleeve.

In witness whereof I have hereunto set my hand.

HANS N. HALVERSEN.